United States Patent
Gschwind et al.

(10) Patent No.: US 9,424,037 B2
(45) Date of Patent: *Aug. 23, 2016

(54) INSTRUCTIONS AND FUNCTIONS FOR EVALUATING PROGRAM DEFINED CONDITIONS

(71) Applicant: International Business Machines Corporation, Armonk, NY (US)

(72) Inventors: Michael K Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/081,480

(22) Filed: Nov. 15, 2013

(65) Prior Publication Data

US 2014/0164747 A1      Jun. 12, 2014

Related U.S. Application Data

(63) Continuation of application No. 13/710,826, filed on Dec. 11, 2012.

(51) Int. Cl.
    *G06F 9/30*      (2006.01)
    *G06F 9/38*      (2006.01)

(52) U.S. Cl.
    CPC ........ *G06F 9/30058* (2013.01); *G06F 9/30021* (2013.01); *G06F 9/384* (2013.01)

(58) Field of Classification Search
None
See application file for complete search history.

(56) References Cited

U.S. PATENT DOCUMENTS

| | | | |
|---|---|---|---|
| 6,609,190 B1 | 8/2003 | Kahle et al. | |
| 7,822,948 B2 | 10/2010 | Lewis | |
| 7,836,289 B2 | 11/2010 | Tani | |
| 2002/0184613 A1* | 12/2002 | Kuzemchak | G06F 11/28 717/126 |
| 2002/0194458 A1* | 12/2002 | Soni | G06F 9/30094 712/227 |
| 2004/0003209 A1* | 1/2004 | Mitsuishi | G06F 9/30018 712/225 |
| 2008/0040590 A1* | 2/2008 | Lee | G06F 9/30094 712/238 |
| 2011/0099357 A1 | 4/2011 | Loen | |

FOREIGN PATENT DOCUMENTS

| | | |
|---|---|---|
| CN | 1348560 | 5/2002 |
| CN | 1860435 | 11/2006 |
| CN | 101482812 | 7/2009 |

OTHER PUBLICATIONS

IBM z/Architecture Principles of Operation, SA22-7832-09, 10th Edition, Sep. 2012.

(Continued)

*Primary Examiner* — William B Partridge
(74) *Attorney, Agent, or Firm* — William A. Kinnaman, Jr.

(57) ABSTRACT

A compare instruction of an instruction set architecture (ISA), when executed tests one or more operands for an instruction defined condition. The result of the test is stored as an operand, with leading zeros, in a general register of the ISA. The general register is identified (explicitly or implicitly) by the compare instruction. Thus, the result of the test can be manipulated by standard register operations of the computer system. In a superscalar processor, no special "condition code" renaming is required, as the standard register renaming takes care of out-of-order processing of the conditions.

6 Claims, 14 Drawing Sheets

(56) References Cited

OTHER PUBLICATIONS

Eduardo Quinones Improving Branch Prediction and Predicated Execution in Out-of-Order Processors, Proceedings of the 13th International Symposium on High-Performance Computer Architectu;re, Feb. 2007, ACM.

William Kreahling, Reducing the Cost of Conditional Transfers of Control by Using Comparison Specifications, LCTES '06, Jun. 14-16, 2006, Ottawa, Canada, ACM.

PCT International Search Report, PCT/CN2013/087894, dated Mar. 14, 2014.

* cited by examiner

INSTRUCTIONS AND FUNCTIONS FOR EVALUATING PROGRAM DEFINED CONDITIONS

CROSS-REFERENCE TO RELATED APPLICATIONS

This is a continuation of U.S. patent application Ser. No. 13/710,826, "BRANCH-FREE CONDITION EVALUATION" filed Dec. 11, 2012, incorporated herein by reference.

FIELD OF THE INVENTION

This invention relates generally to computer system instruction set architecture, and more specifically to instructions and functions for evaluating program defined conditions.

BACKGROUND

Microprocessors typically function by executing a series of instructions organized in a program. Microprocessors are referred to hereinafter as processors. A processor may execute an instruction over one or more clock cycles. To increase the execution of instructions, some processors concurrently execute one or more instructions. The z/Architecture Principles of Operations, (SA22-7832-09) published September, 2012 by IBM and incorporated by reference herein in its entirety teaches an example instruction set architecture (ISA).

For example, a first and second instruction may be executed concurrently if the second instruction is not dependent on the first instruction. As a result, some sequential instruction groups may be difficult to execute concurrently. As a result, modern processors often execute instructions out of order to increase throughput, concurrently processing unrelated instructions.

In addition, modern processors may be configured to execute more than one instruction per clock cycle. Thus a first instruction may be executed while a later third instruction is executed out of order, followed by the execution of a second instruction.

Unfortunately, it is more difficult to issue multiple instructions. Issuing and executing multiple instructions per cycle requires significant hardware support to track and resolve dependencies, with the hardware requirements typically increasing with the square of the number of execution units.

U.S. Pat. No. 6,609,190 titled "Microprocessor with primary and secondary issue queue" by James Allan Kahle et. al, and assigned to IBM, filed Jan. 6, 2000 teaches a processor and data processing system suitable for dispatching an instruction to an issue unit. The issue unit includes a primary issue queue and a secondary issue queue. The instruction is stored in the primary issue queue if the instruction is currently eligible to issue for execution. The instruction is stored in the secondary issue queue if the instruction is currently ineligible to issue for execution. An instruction may be moved from the primary issue queue to the secondary issue queue if instruction is dependent upon results from another instruction. In one embodiment, the instruction may be moved from the primary issue queue to the secondary issue queue after issuing the instruction for execution. In this embodiment, the instruction may be maintained in the secondary issue queue for a specified duration. Thereafter, the secondary issue queue entry containing the instruction is deallocated if the instruction has not been rejected. This patent is incorporated herein in its entirety.

U.S. Pat. No. 7,822,948 titled: "Apparatus, system, and method for discontiguous multiple issue of instructions" by Russell Lee Lewis and assigned to IBM, filed Jan. 3, 2008 teaches discontiguous multiple issue of instructions. An assignment unit assigns a plurality of instruction blocks to a plurality of issue units. The plurality of issue units each comprises a renaming map that maps each architecturally visible register address to a rename register. Each issue unit maps each architecturally visible register in the decoded instruction to a register placeholder if the renaming map entry for that architecturally visible register is invalid else maps the architecturally visible register in the decoded instruction to a rename register if the rename register entry is valid. Each issue unit further receives predecessor mapping information from the renaming map of the issue unit's predecessor issue unit in response to the assignment unit identifying a relationship with the predecessor issue unit and the final mapping information being available from the predecessor issue unit. This patent is incorporated herein in its entirety.

SUMMARY

A compare instruction of an instruction set architecture (ISA), when executed tests one or more operands for an instruction defined condition. The result of the test is stored as an operand, with leading zeros, in a general register of the ISA. The general register is identified (explicitly or implicitly) by the compare instruction. Thus, the result of the test can be limiting manipulated by standard register operations of the computer system. In a superscalar processor, no special "condition code" renaming is required, as the standard register renaming takes care of out-of-order processing of the conditions.

In an embodiment, a method is performed comprising executing, by a processor, a compare instruction. The execution comprises obtaining a first operand consisting of a number of bits, obtaining a second operand consisting of the number of bits, comparing the first operand and the second operand to determine a condition, the condition indicating the result of the compare. And storing the condition as a third operand, the third operand consisting of the number of bits.

In an embodiment, the executing the compare instruction, further comprises setting a condition code indicating condition.

In an embodiment, the compare instruction specifies a first register and a second register, wherein the first operand is obtained from the first register and the second operand is obtained from the second register and the third operand is stored in the second register.

In an embodiment, the storing the condition comprises storing an indicator field as a low order field of the third operand and storing 0s to all other bits of the third operand.

In an embodiment, the indicator field is an indicator bit, wherein the indicator bit is 1 based on the compare being equal and the indicator bit is 0 based on the compare being not equal.

In an embodiment, the compare instruction specifies a first register, a second register and a third register, wherein the first operand is obtained from the first register and the second operand is obtained from the second register and the third operand is stored in the third register.

In an embodiment, the compare instruction is a compare instruction of a first instruction set architecture (ISA) and the method further comprises: selecting, by emulation software, an emulation routine for performing the executing on a processor of a second ISA, wherein the emulation routine comprises instructions of the second ISA; and performing the executing using the emulation routine.

System and computer program products corresponding to the above-summarized methods are also described and claimed herein.

Additional features and advantages are realized through the techniques of the present invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
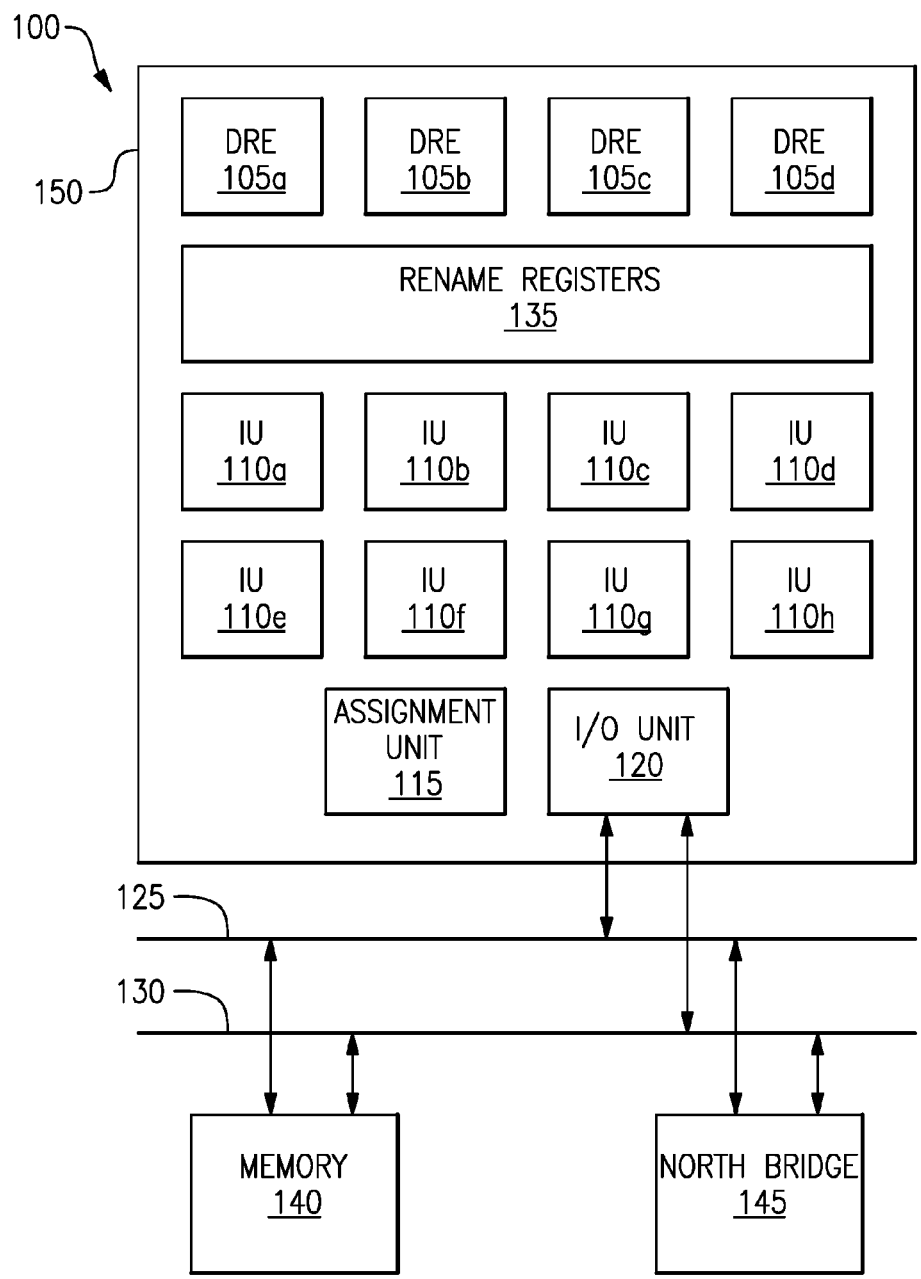
FIG. 1 illustrates an embodiment of a computer system.

In an example embodiment of a superscalar processor according to U.S. Pat. No. 7,822,948 (Lewis), FIG. 1 is a schematic block diagram illustrating one embodiment of a computing system 100. The system 100 includes a processor 150, a memory 140, a north bridge 145, a data bus 125, and an address bus 130. The processor 150 includes one or more dependency resolution/execution unit (DRE) 105, one or more rename registers 135, one or more instruction units 110, assignment unit 115, and an input/output (I/O) unit 120. The processor 150, memory 140, and north bridge 145, may be configured as semiconductor devices.

The processor 150 addresses instructions in the memory 140 over the address bus 130. The memory 140 communicates the instructions to the processor 150 over the data bus 125 as is well known to those of skill in the art. The processor 150 executes the instructions. As used herein, data may refer to data, instructions, and addresses.

The north bridge 145 may communicate data to the memory 140 and the processor 150. In one embodiment, the north bridge 145 communicates with the south bridge. The south bridge may communicate with storage devices, network devices, and the like.

The processor 150 executes instructions received from the memory 140 and the north bridge 145. The I/O unit 120 receives data from the memory 140 and the north bridge 145. In addition, the I/O unit 120 communicates data to the memory 140 and the north bridge 145. The assignment unit 115 assigns instruction blocks to instruction units 110 as will be described hereafter.

The instructions include references to architecturally visible (AV) registers. For example, an instruction set for the processor 150 may allow data to be stored in one of 32 AV registers. The rename registers 135 each store data and assume the address of an AV register. Continuing the example above, the rename registers 135 may comprise 128 registers that may store data directed to the AV registers. The AV registers may be virtual registers, with the data stored in rename registers 135 at assume the addresses of AV registers. For simplicity the rename registers 128 are shown as a single unit. The rename registers 135 may be implemented as a bank of semiconductor memory registers as is well known to those of skill in the art.

The instruction units 110 may issue multiple instructions to the DRE 105 during a clock cycle. Such multiple issues have required significant hardware resources in the past.

The assignment unit 115 assigns a plurality of instruction blocks to the plurality of issue units 110. In addition, the assignment unit 115 tracks dependencies between the instruction blocks. The assignment unit 115 further assigns a pointer linking a predecessor instruction block with a successor instruction block when a dependency is identified between the predecessor and successor instruction blocks. The linked instruction blocks form a chain. The instructions of the instruction blocks reference the AV registers.

The plurality of issue units 110 each comprises a renaming map. Each issue unit 110 is configured to each receive predecessor mapping information from the renaming map of the issue unit's predecessor issue unit 110 in response to the assignment unit 115 identifying a relationship with the predecessor issue unit 110 and final mapping information being available from the predecessor issue unit 110.

The issue unit 110 issues an instruction block to one of the DRE 105 after all register placeholders in all pre-issued instructions have been changed to point to rename registers 135. The DRE 105 receives instruction blocks from the plurality of issue units 110. In one embodiment the DRE 105 hold each instruction until each rename register with an input of the instruction contains valid data. In addition, the DRE 105 may execute the instruction when all inputs are valid. The DRE 105 write may the result, if any, in a rename register chosen during the pre-issue stage to hold the result.

Figures 2, 3:
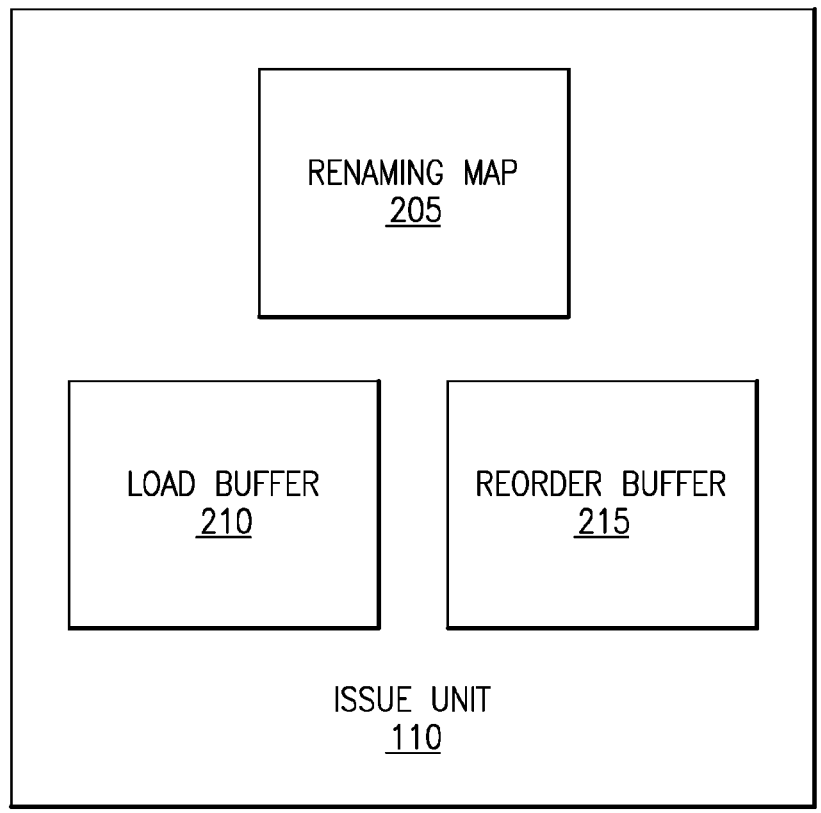
FIG. 2 illustrates an embodiment of an issue unit.
FIG. 3 illustrates an embodiment of a renaming map.

FIG. 2 is a schematic block diagram illustrating one embodiment of an issue unit 110. The issue unit 110 is illustrative of each of the issue units 110 of FIG. 1. In the depicted embodiment, the issue unit 110 includes a renaming map 205, a load buffer 210, and a reorder buffer 215. The description of the issue unit 110 refers to elements of FIG. 1, like numbers referring to like elements.

The renaming map 205 maps each AV register address to a rename register 135 as will be described hereafter. The issue unit 110 issues a load request and/or store request to the load buffer 210. The load request directs that data be loaded into an AV register from the memory 140 and/or through the north bridge 145 from another device such as a hard disk drive. The store request directs that data be copied from an AV register to the memory 140 and/or a device in communication with the north bridge 145. The load buffer 210 may reorder data as the data is loaded and/or prior to storing the data.

The reorder buffer 215 manages the out-of-order execution of instructions so that the execution is logically equivalent to in-order execution. For example, the reorder buffer 215 may hold the execution of the second successor instruction until results from a first predecessor instruction are available.

FIG. 3 is a schematic block diagram illustrating one embodiment of a renaming map 205. The renaming map 205 is the renaming map of FIG. 2. The description of the renaming map 205 refers to elements of FIGS. 1-2, like numbers referring to like elements.

In one embodiment, the renaming map 205 includes one or more entries 305. In a certain embodiment, the renaming map 205 includes one entry 305 for each rename register 135. Each entry 305 includes a rename register identifier (ID) 310, a valid flag 315 and a placeholder ID 320. The rename register ID 310 may store an AV register address. Thus the rename register ID 310 associates a rename register 135 with an AV register. The valid flag 315 indicates whether the mapping stored in the rename register ID field is valid. The valid flag 315 may be set to true such as a binary one (1) value when the mapping is valid and to false such as a binary zero (0) when the mapping is invalid.

In one embodiment, the placeholder register 320 is an identifier that may be used in place of a rename register 135 until the rename register 135 is associated with an AV register. The placeholder register 320 may be a virtual register and does not physically store data.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
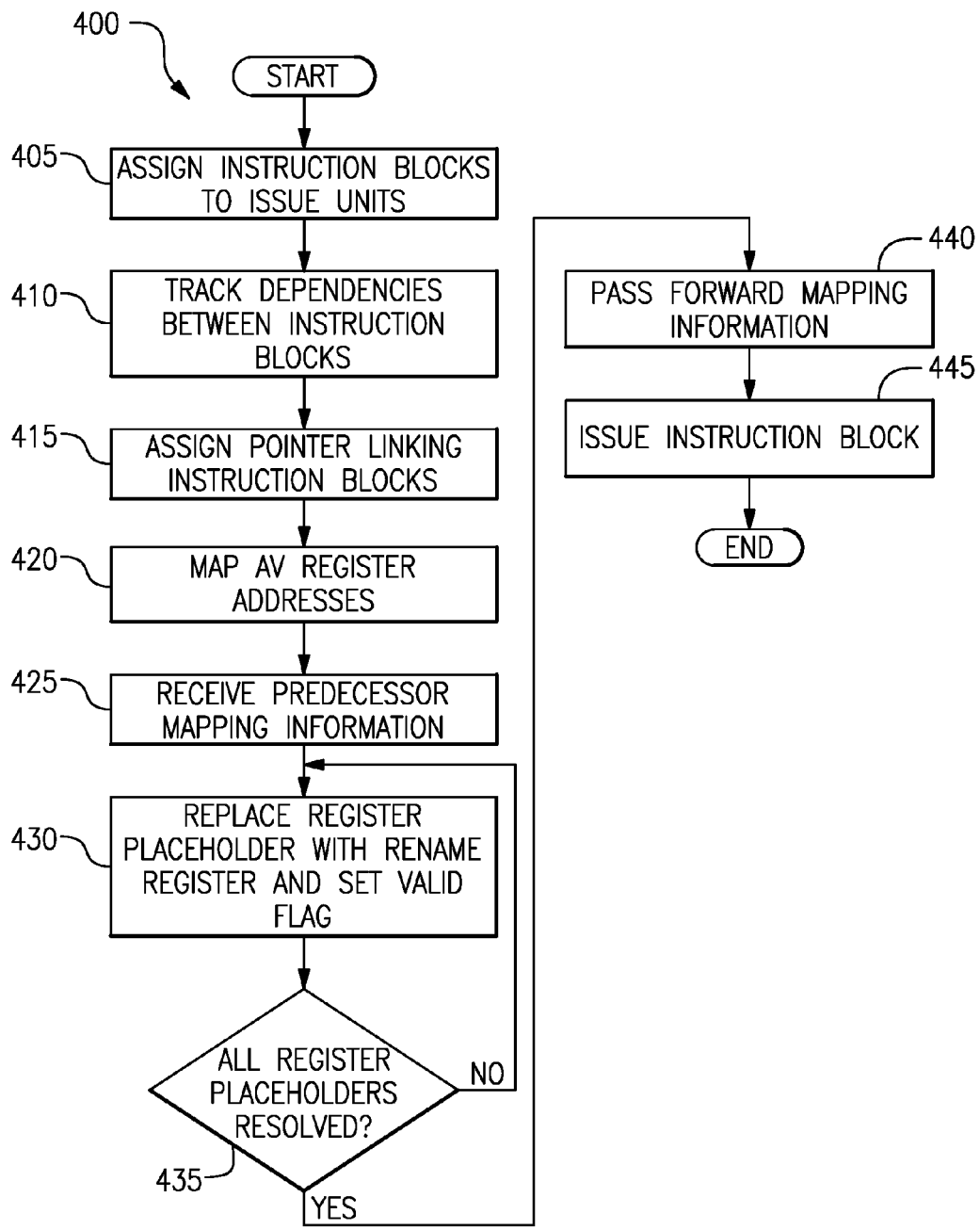
FIG. 4 illustrates an embodiment of a multiple issue method.

FIG. 4 is a schematic flow chart diagram illustrating one embodiment of a multiple issue method 400. The method 400 substantially includes the steps to carry out the functions presented above with respect to the operation of the described apparatus and system of FIGS. 1-3. In one embodiment, the method 500 is implemented with a microcode product comprising a semiconductor instruction storage having a microcode program. The microcode program may be integrated into a computing system, such as the processor 150 of the computer system 100, wherein the program in combination with the computing system 100 is capable of performing the method 400.

The method 400 begins and the assignment unit 115 assigns 405 a plurality of instruction blocks to a plurality of issue units 110. For example, the assignment unit 115 may assign a first instruction block to a first issue unit 110a and a second instruction block to a second issue unit 110b. The assignment unit 115 may divide instructions of a program into instruction blocks based on a heuristic. For example, the assignment unit 115 may create an instruction block of the instructions preceding a branch instruction and/or a write instruction.

In one embodiment, the assignment unit 115 may assign 405 each of a plurality of issue units 110 a discrete instance of an instruction block comprising a loop. For example, a third instruction block may comprise an instruction loop that may be repeated a plurality of times such as a WHILE loop as is well known to those of skill in the art. The assignment module 215 may assign 405 a first instance of the third instruction block to the first issue unit 110a, a second instance of the third instruction block to the second issue unit 110b, and a third instance of the third instruction block to a third issue unit 110c. In a certain embodiment, the third instance of the third instruction block is a successor instruction block to the second instance of the third instruction block, and a second instance of the third instruction block is a successor instruction block to the first instance of the third instruction block.

The assignment unit 115 may assign 405 a speculative instruction block to an issue unit 110. The speculative instruction block is not a known successor of an instruction block in a current chain comprising a currently issued instruction block. In one embodiment, the assignment unit 115 employs a heuristic to speculatively assign 405 the speculative instruction block. For example, the heuristic may direct the speculative assignment 405 of instruction blocks that begin with a branch target.

The assignment unit 115 may speculatively assign 405 a return instruction block to an issue unit 110. The return instruction block may include the destination instruction of one or more branch instructions. For example, if the assignment unit 115 identifies the return instruction block, the assignment unit 115 may assign 405 to return instruction block to an issue unit 110 and later link the return instruction block to a predecessor instruction block. In one example, the assignment unit 115 may speculatively issue a return instruction block comprising a current instruction when the processor 150 receives an interrupt and/or system call. Although the assignment unit 115 cannot determine which instruction block will ultimately branch to the return instruction block, the return instruction block will be available when the processor 150 completes handling the interrupt and/or system call. Thus the handling of interrupts and system calls can be accelerated.

The assignment unit 115 tracks 410 dependencies between the instruction blocks. For example, if the second instruction block is configured to be executed following the first instruction block, the assignment unit 115 may record that the first instruction block is a predecessor instruction block to the second instruction block and that the second instruction block is a successor to the first instruction block. In one embodiment, the assignment unit 115 may track 410 dependencies between instruction blocks until each instruction block is executed or terminated.

The assignment unit 115 further assigns 415 a pointer linking a predecessor instruction block with a successor instruction block when a dependency is identified between the predecessor and successor instruction blocks as will be shown hereafter. The linked instruction blocks form a chain. In one embodiment, the pointer indicates where a predecessor instruction block's mapping information should be sent after the predecessor instruction block's instructions have been issued.

In one embodiment, the assignment unit 115 assigns 415 a pointer linking a speculative predecessor instruction block with a speculative successor instruction block when a dependency is identified between the speculative predecessor and speculative successor instruction blocks as will be described hereafter. The linked instruction blocks form a speculative chain.

The issue unit renaming maps 205 each map 420 AV register address in an instruction block to a rename register 135. In one embodiment, an issue unit 110 receives a first instruction block from the assignment unit 115. The issue unit 110 sets each valid flag 315 in the renaming map 205 to false. The issue unit 110 then pre-issues each instruction in the first instruction block by decoding each instruction. The issue unit 110 may pre-issue an instruction by referring an AV register referenced in the instruction to a register placeholder 320. The issue unit 110 may refer the AV register to the register placeholder 320 if and only if there are no instructions earlier in the instruction block which write to the AV register. In one embodiment, the issue unit 110 refers the AV register to a register placeholder 320 by writing a register placeholder ID to placeholder register 320 in a renaming map entry 305 for the AV register.

In one embodiment, issue unit 110 pre-issues the instruction by referring an AV register to a rename register 135. The issue unit 110 may refer the AV register the rename register 135 if and only if the rename register 135 is the rename register 135 which is the assigned destination rename register 135 for the most recent write to the AV register in the instruction block.

In one embodiment, semiconductor logic decodes each instruction. The semiconductor logic may include a sequencer that performs one or more functions in response to each instruction. For example, bits in the instruction may provide inputs to a sequencer state machine. The sequencer state machine may advance through a series of states and assert control lines in response to the instruction bits as is well known to those of skill in the art.

In addition, the issue unit 110 maps 420 each AV register in the decoded instruction to a register placeholder 320 if the renaming map entry 305 for that AV register is invalid. In one embodiment, the renaming map entry 305 is invalid if the invalid flag 315 is false. If the renaming map entry 305 is valid, the issue unit 110 maps the AV register in the decoded instruction to the rename register 135.

In one embodiment, the issue unit 110 selects a rename register 135 to contain the results of an instruction. The issue unit 110 may update the renaming map 205 to map the AV register to the rename register 135. In addition, the issue unit 110 may mark the rename register entry 305 as valid if the instruction writes to an AV register. In one embodiment, the issue unit 110 marks the rename register entry 305 as valid by setting the valid flag 315 for the rename register entry 305 to true.

The issue unit 110 further receives 425 predecessor mapping information from the renaming map 205 of the issue unit's predecessor issue unit 110 in response to the assignment unit 115 identifying a relationship with the predecessor issue unit and final mapping information being available from the predecessor issue unit 110. The predecessor issue unit 110 may send mapping information although the issue unit 110 is pre-issuing instructions.

In one embodiment, the final mapping information includes a mapping of at least one of the AV registers to a respective rename register 135. The mapping may reflect the correct mappings upon completion of the predecessor mapping information's block of instructions. For example, if the issue unit issues a first instruction block and resolves the rename register values for AV registers modified by the first instruction block, the predecessor issue unit 110 may communicate the final mapping information including valid rename registers 135 for the AV registers to the successor issue unit 110.

In one embodiment, when the issue unit 110 receives the predecessor mapping information, the successor issue unit 110 updates the renaming map 205 by updating a renaming map entry 305 for which the predecessor mapping information includes a valid mapping and the successor issue unit does not have a valid mapping. In addition, the issue unit 110 may update the renaming map 205 by recording the mapping information in the successor issue unit renaming map 205, and marking the renaming map entry 305 as valid such as by setting the valid flag 315 to true.

When receiving predecessor mapping information, the issue unit 110 may update each pre-issued instruction that refers to a register placeholder 320 where the received predecessor mapping information specifies a mapping for the AV register mapped to the register placeholder 320. In addition, the issue unit 110 may update the pre-issued instruction by modifying the pre-issued instruction to point to the rename register 135 specified in the predecessor mapping information. If all instructions in the instruction block have already been pre-issued and a successor issue unit 110 is identified, the issue unit 110 passes 440 forward any new mapping information to a successor issue unit 110. The issue unit 110 may send the new mapping information although the successor issue unit 110 is pre-issuing instructions.

Each issue unit 110 issues 445 a block of instructions to one of the plurality of DRE 105 after all register placeholders 320 in all pre-issued instructions have been changed to point to rename registers 135 and the method 500 ends. In one embodiment, the issue unit 110 issues 445 a single instruction to a DRE 105 when the single instruction no longer refers to any placeholder registers 320. The issue unit 110 may issue the single instruction even though the issue unit 110 may still have some other instructions which refer to placeholder registers 320.

The method 400 allows the discontiguous issue of multiple instructions. Using the method 400, the processor 150 may issue and execute more than one instruction per clock cycle. In addition, the hardware required to support multiple issue may be reduced.

Figure 5:
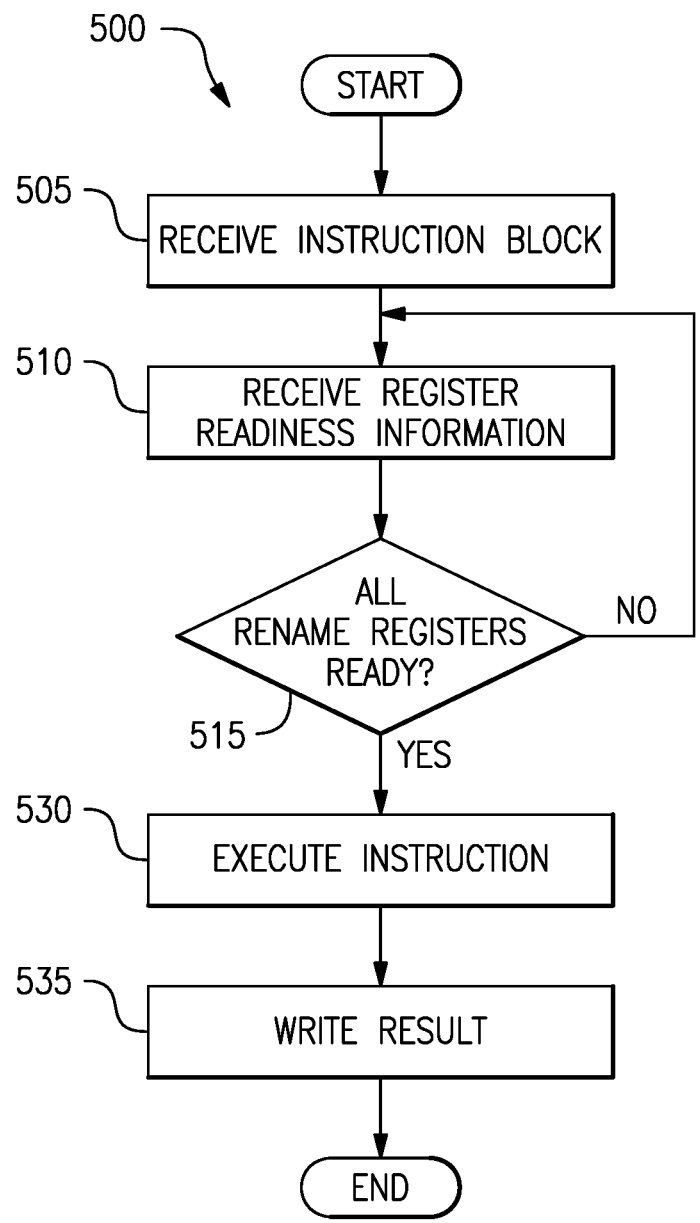
FIG. 5 illustrates an embodiment of a multiple execution method.

FIG. 5 is a schematic flow chart diagram illustrating one embodiment of a multiple execution method 500. The method 500 substantially includes the steps to carry out the functions presented above with respect to the operation of the described apparatus and system of FIGS. 1-3. In one embodiment, the method 500 is implemented with a microcode product comprising a semiconductor instruction storage having a microcode program. The microcode program may be integrated into a computing system, such as the processor 150 of the computer system 100, wherein the program in combination with the computing system 100 is capable of performing the method 500.

The method 500 begins and a DRE 105 of the plurality of DREs 105 receives 505 an instruction block from an issue unit 110. Any issue unit 110 may communicate the instruction block to any DRE 105. Each instruction in an instruction block includes information about the operation that must be performed, the input rename registers 135 if any, and the destination rename register 135 if any. All rename registers 135 are identified by a renaming register ID 310, and the DRE 105 is entirely unaware of which renaming registers 135 represent which AV registers. Thus, the instruction block is never sent to the DRE 105 until all of placeholders 320 referring to AV registers have been replaced with the appropriate renaming register IDs 310.

In one embodiment, the DRE 105 determines 515 if all the rename registers 135 which are inputs to a given instruction are ready. For example, the DRE may check the valid flag 315 for each rename register 135. If all the rename registers 135 which constitute the input for an instruction are not ready, the DRE 105 continues to receive 510 readiness information. The DRE 105 may hold the instruction until each rename register 135 with an input to the instruction contains valid data. For example, the DRE 105 may hold an add instruction until two rename registers 135 holding the inputs for the add instruction contain valid data.

If the DRE 105 determines 515 that all the rename registers 135 are ready, the DRE 105 may execute 530 the instruction as is well known to those of skill in the art. Continuing the example above, the DRE 105 may add values stored in the two rename registers 135.

In one embodiment, the issue unit 110 may issue 445 and the DRE 105 may execute 530 an instruction block of a mis-predicted branch. For example, if the assignment unit 115 determines that a fourth instruction block will not be executed, the issue unit 110 may speculatively issue 445 the fourth instruction block. Similarly the DRE 105 may speculatively execute 530 instructions of the fourth instruction block. Thus the results of the fourth instruction block may be available if needed.

In one embodiment, the DRE 105 writes 535 a result, if any, to a rename register 135. The rename register 135 may be chosen during the pre-issue to hold the result. In one embodiment, the DRE 105 writes 535 the result to the rename register 135 and sets the valid flag 315 for the rename register to true.

The method 600 resolves rename register values and executes instructions employing the rename registers 135. In addition, the method 600 allows instruction blocks to be issued 445 before all rename register values in the instruction blocks are valid.

Figure 6:
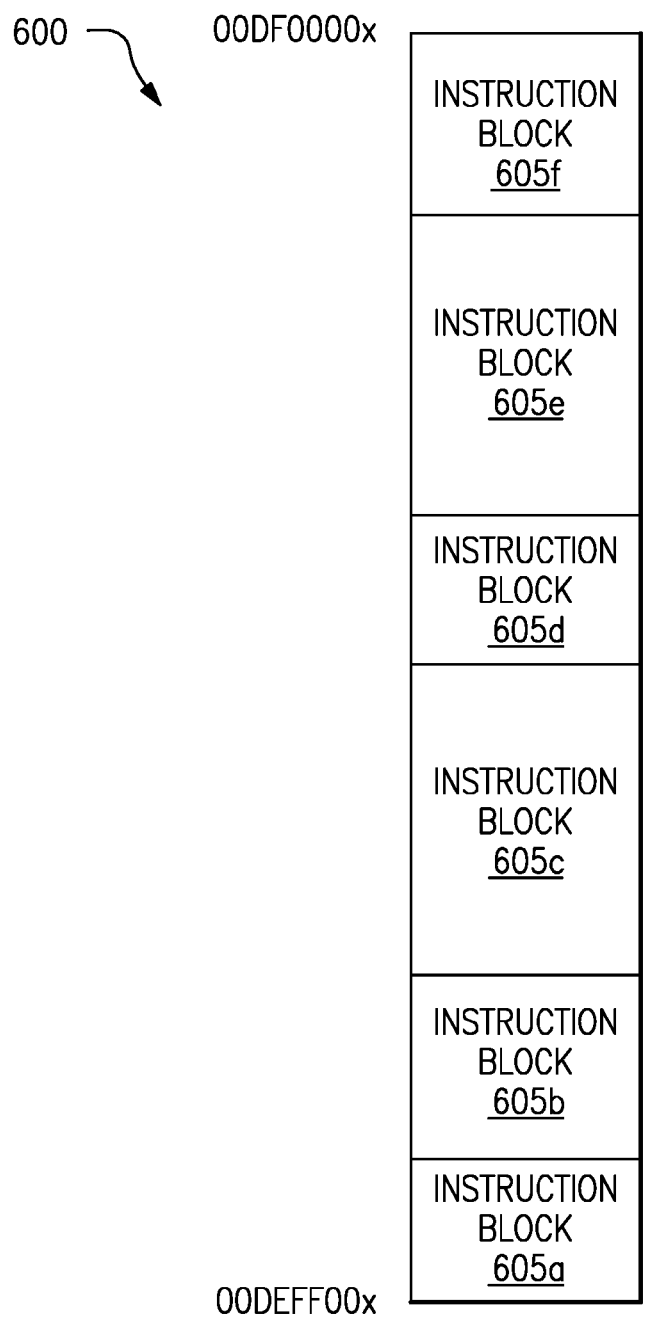
FIG. 6 illustrates an example instruction.

FIG. 6 is a schematic block diagram illustrating one embodiment of instructions 600. The instructions 600 may be embodied in a computer program that is executed by the processor 150 of FIG. 1. The description of the instructions 600 refers to elements of FIGS. 1-5, like numbers referring to like elements.

As depicted, the instructions are stored between hexadecimal addresses 00DF0000x and 00DEFF00x. In one embodiment, the assignment unit 115 organizes the instructions 600 into a plurality of instruction blocks 605. The assignment unit 115 may employ a heuristic to organize the instruction blocks 605. For example, a heuristic may direct that no instruction block 605 may exceed 20 instructions in length. Similarly, the heuristic may direct that any branch instruction ends an instruction block 605.

Figure 7:
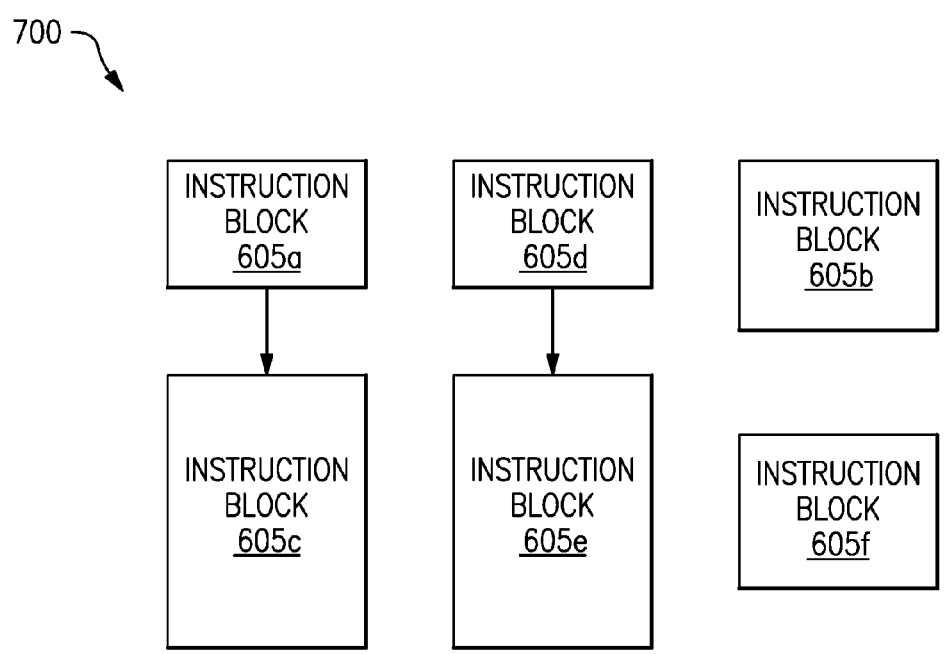
FIG. 7 illustrates an embodiment of linked instruction blocks.

FIG. 7 is a schematic block diagram illustrating one embodiment of linked instruction blocks 700. The instruction blocks 605 of FIG. 6 are shown organized with dependencies. For example, the assignment unit 115 may identify a dependency between a first instruction block 605a and a third instruction block 605c. The assignment unit 115 may assign 415 a pointer that links the first instruction block 605a with the third instruction block 605c. Similarly, the assignment unit 115 may assign 415 a pointer linking a fourth instruction block 605d with a fifth instruction block 605e. If the assignment unit 115 does not identify a predecessor instruction block and/or a successor instruction block for an instruction block, the assignment unit 115 may not link the instruction block 605. For example, a second and sixth instruction blocks 605b, 605f may not be linked if the assignment module 115 does not identify a predecessor instruction block and/or a successor instruction block for the second and sixth instruction blocks 605b, 605f.

Figure 8:
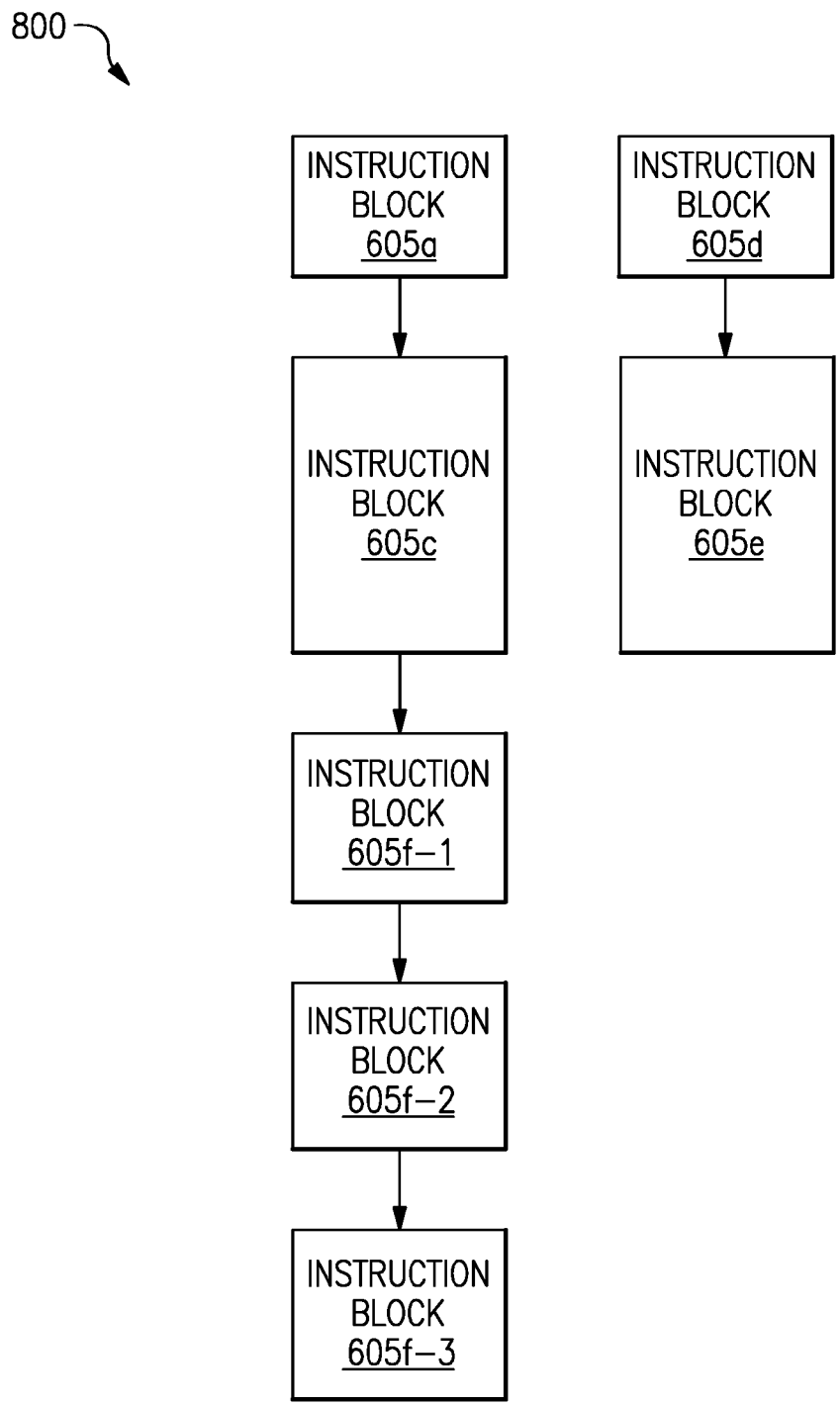
FIG. 8 illustrates an alternate embodiment of linked instruction blocks.

FIG. 8 is a schematic block diagram illustrating one alternate embodiment of linked instruction blocks 800. The instruction blocks 605 of FIGS. 6 and 7 are shown after the assignment unit 115 has identified additional dependencies. For example, the assignment unit 115 may determine that the sixth instruction block 605f is a successor to the third instruction block 605c and assign a pointer from the third instruction block 605c to the sixth instruction block 605f.

In the depicted embodiment, the assignment unit 115 further determines that at least three instances of the sixth instruction block 605f may be executed. Thus the assignment unit 115 links the third instruction block 605c to of first instance of the sixth instruction block 605f-1. In addition, the assignment unit 115 links the first instance of the sixth instruction block 605f-1 to a second instance of the sixth instruction block 605f-2 and links the second instance of sixth instruction block 605f-2 to a third instance of the sixth instruction block 605f-3.

The linked instruction blocks 605a, 605c, 605f-1, 605f-2, 605f-3 may form a speculative chain. A speculative chain is a chain of instruction blocks 605 where it is not yet certain that the first instruction block 605a will ever execute, but it is certain that if the first instruction block 605a executes, all of the other instruction blocks 605 in the chain will execute in the order given. The assignment unit 115 may assign 415 a pointer linking a speculative predecessor instruction block with a speculative successor instruction block when a dependency is identified between the speculative predecessor and speculative successor instruction blocks. Thus although the assignment unit 115 is not certain that the first instruction block 605a will ever run, the assignment unit 115 is certain that if the first instruction block 605a runs, it will be followed by 605c, and at least three instances of the sixth instruction block 605f.

Figure 9:
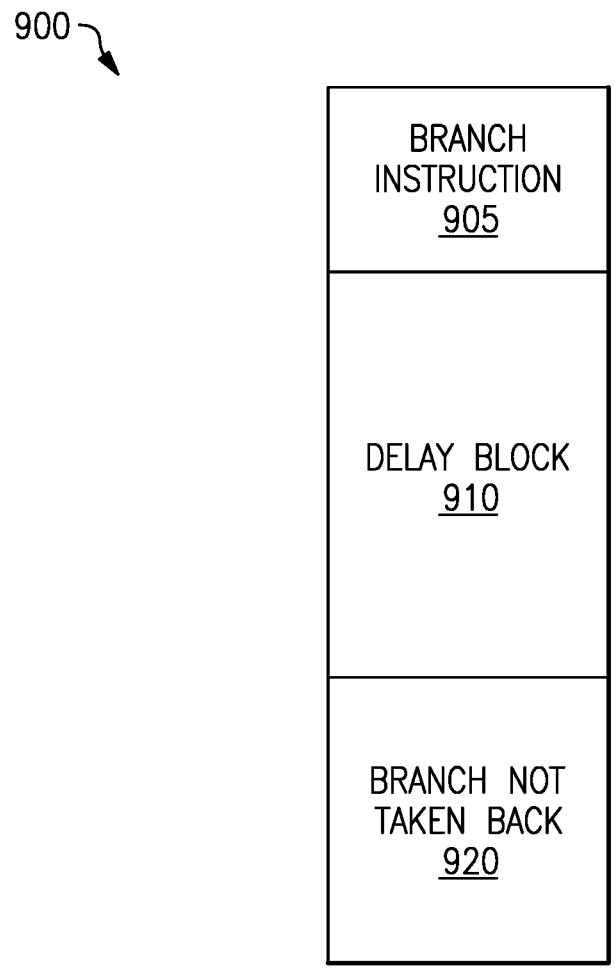
FIG. 9 illustrates an embodiment of a delay block.
Figure 9:
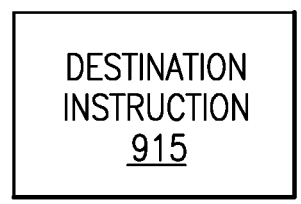

FIG. 9 is a schematic block diagram illustrating one embodiment of a delay block 900. The delay block 900 may be embodied in instructions 600 of FIG. 6. In one embodiment, the issue unit 110 receives a branch instruction 905 and a destination instruction 915. The branch instruction 905 may specify a condition. For example, a branch instruction 905 may specify the condition that a first AV register is equal to a second AV register. If the first AV register is equal to the second AV register, the processor at 150 must execute the destination instruction 915. If the first AV register is not equal to the second AV register, the processor 150 must continue to execute code at the next instruction in a branch not taken block 920 after the branch delay block 910.

However, the processor 150 may require multiple clock cycles to determine if the first AV register is equal to the second AV register. In one embodiment, the issue unit 110 queues the branch instruction 905, a delay block 910 of at least two instructions, the next instruction in the branch not taken block 920, and the destination instruction 915 for the branch instruction 905. The delay block instructions are queued to execute before the branch not taken block 920 and destination instruction 915 to increase instruction throughput.

The issue unit 110 may issue 445 and the DRE 105 may execute 530 the delay block 910 while the DRE 105 determines if the destination instruction 915 will be executed. Thus the issue unit 110 and DRE 105 are more fully utilized. Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute microcode programs stored on tangible storage devices, and/or execute programmed functions.

Programs are written or compiled to machine language instructions that are understandable by a processor. The processor is designed to an instruction set architecture that includes a variety of instructions. Typically, an instruction set would include arithmetic instructions, Boolean instructions, memory load and store instructions and branch or jump instructions for example. Many of the instructions of the instruction set, when executed set condition code values. The condition code values can then be used by branch or jump instructions to conditionally elect to divert from the sequential execution of instructions (branch not taken) and go to a predetermined location to begin execution of instructions starting at that location (branch taken).

Branch (and jump) instructions are very useful for structuring code modules, by testing for conditions that would determine which code module to execute next. One problem with branch type instructions is that they cause a performance disruption in the processor. A processor implementing a pipeline can perform very fast as long as instructions can be introduced into the pipeline every clock cycle. If a branch is encountered, the pipeline may stall, while waiting for a determination of whether the branch is taken or not. Furthermore, if the processor is prefetching instructions to keep the instruction pipeline full, the prefetching may stall. Prediction techniques have been implemented to allow the execution of instructions following a branch, to be speculatively executed in order to reduce the effect of the branch. When the speculation is wrong, the pipeline needs to be flushed and/or the prefetching has to be redirected which causes an additional delay.

An improved instruction set architecture is presented that includes instructions for setting condition indicators of results of Boolean operations (condition codes) for example, in general purpose registers rather than condition code registers, so they can be manipulated with sequential instructions rather than branches. For complex condition evaluation, the number of branches encountered is thereby minimized. Such an improved instruction set architecture may still employ condition code registers for branch instructions, or may employ new branch instructions for branching on content of general registers. Conditions can be evaluated without branching, which minimizes the number of branches encountered in complex evaluations. Thus the "branchy code" necessary to express complex Boolean expressions in previous instruction set architectures is less branchy in the improved instruction set architecture.

By way of example of how such an improvement could benefit an ISA, the following shows an example complex condition named /Testt/ to be analyzed:
Where "rn" represents "register n" of a set of registers addressable by an instruction and where /xxx/represents a label or comment.

```
/Test/  if (((r1 < r2) && ( r1 >= r3)) || ((r1 >= r2) && (r2 >= r4)))
  /** foo **/
  else
  / bar /
```

Which is functionally equivalent to:
/Test/ tests if (A and B) or (C and D) is true or not, where:
A is true if contents of register 1 (r1) is less than the contents of register 2 (r2);
B is true if contents of register 1 (r1) is greater than or equal to the contents of register 3 (r3);
C is true if contents of register 1 (r1) is greater than or equal to the contents of register 2 (r2); and
D is true if contents of register 2 (r2) is greater than or equal to the contents of register 4 (r4);

If the test /Test/ is true the code goes to a location labeled "foo" which may be the next sequential instruction (branch not taken). If the test /Test/ is false, the code goes to a location labeled "bar" which may be a branch taken to a non-sequential location.

Algorithms often have complex conditions as part of the program logic. Such algorithms, when compiled or assembled into machine instructions generate "branchy" code. Branchy code refers to a software routine that has a high density of branch instructions. Branch instructions are disruptive, in that the following instruction(s) can only be executed, when the branch condition of the branch instruction is resolved. In speculative execution machines, instructions are speculatively executed in order to permit instructions to be executed in parallel or out of order. When a branch instruction is executed speculatively, the following instructions are also speculatively executed until the branch is resolved. If the branch guess was wrong, the instructions in the pipeline must be flushed. Also, instruction prefetching from the memory subsystem is similarly disrupted by branching. An algorithm executed in conventional branchy code is exemplified below for the /Test/ example:

```
/Test/  if (((r1 < r2) && ( r1 >= r3)) || ((r1 >= r2) && (r2 >= r4)))
  /** foo **/
  else
  / bar /
```

In an assembler code /Test/ may generate the following exemplary instructions:

```
.LCFI3:
    cr       r1,r2 /** cr is a compare instruction that compares
the contents of register 1 and 2**/
    jhe      .L13 /**jhe is a jump instruction that jumps to L13
if condition codes (cc's) indicate higher than, or equal to**/
    cr       r1,r3
    jl       .L14 /**j1 is a jump instruction that jumps to L13
if cc's indicate lower than**/
.L10:
    /*** foo **/
.L14:
    cr       r1,r2
    jl       .L9
.L13:
    cr       r2,r4
    jhe      .L10
.L9:
    /** bar **/
```

Branchy condition evaluation often leads to degradation of performance. For example, mispredicted branches incur significant penalty since speculatively executed instructions must be flushed from the pipeline. Also, data dependent branches are particularly hard to predict correctly. Even correctly predicted taken branches disrupt instruction fetch and prefetch performance.

In PowerPC Instruction Set Architecture (ISA) from IBM and IA64 ISA from Intel, multiple condition codes and logical operations are defined to reduce the branchiness penalty. This requires adding a new register file and a full set of new instructions to operate on that register file. A new predicate register file, save and restore instructions for predicate file context switch (and a new application binary interface (ABI), new logical instructions on predicates, new compares generating results in predicate registers and new conditional branches on predicates may be employed for example. An ABI may comprise a set of conventions to save and restore registers of a predicate or condition register file, assigning for each register how it is to be saved and restored, i.e., whether a register is volatile or non-volatile across a function call Alpha from DEC and MIPS compute results into general purpose register files. Disadvantageously, this organization requires instructions adapted to branch based on the value of general purpose registers and may prevent common microarchitecture optimizations associated with condition code fields, program status words, or condition registers, A microarchitecture includes machine dependent logic design architecture, including circuits and micro-instructions for example, for implementing program accessible features of an ISA.

In the Alpha ISA, Branch instructions have a 6-bit opcode field, a 5-bit Ra field and a 21-bit displacement field. The Ra field specifies a register to be tested by a conditional branch instruction, and if the condition is met, the program counter is updated by adding the contents of the displacement field with the program counter. The displacement field contains a signed integer and if the value of the integer is positive, if the branch is taken then the program counter is incremented.

Alpha conditional branches test whether the least significant bit of a register is set or clear, or compare a register as a signed quadword to zero, and branch if the specified condition is true. These conditions available for comparing a register to zero are equality, inequality, less than, less than or equal to, greater than or equal to, and greater than. The new address is computed by longword aligning and sign extending the 21-bit displacement and adding it to the address of the instruction following the conditional branch.

Alpha unconditional branches update the program counter with a new address computed in the same way as conditional branches. They also save the address of the instruction following the unconditional branch to a register. There are two such instructions, and they differ only in the hints provided for the branch prediction hardware.

Alpha includes instructions that can set the low-order bit of a result operand to a 1 or 0 indication a condition. Thus, the Alpha low-order bit condition indication needs to be considered (and likely ignored) in subsequent arithmetic/or logical use of the result.

The MIPS ISA had no condition registers. Integer Branch instructions performed an opcode defined test on specified register locations (greater than, less than and equal for example) in order to determine if the branch condition was met or not. MIPS floating point Branch instructions tested for specified Floating point conditions in order to determine whether the Branch condition was met.

The use of a single condition code stored in a special register (such as the program status word (PSW) stored in an architecture defined location of memory of the IBM zArchitecture) has proven to be restrictive with respect to the ability to compute and maintain multiple conditions, and to separate a compare sequence from a conditional branch depending on the outcome of a compare sequence. Not separating condition computation from branching may lead to performance degradation even in the presence of sophisticated branch prediction logic, because the compare instruction must complete and retire a result in a pipeline before the branch instruction, because a dependence between a compare and a branch will need to be resolved before the branch can be committed.

Processing of conditions may be done in general purpose registers, or dedicated condition or predicate registers. Maintaining multiple conditions in separate general purpose registers increases register pressure, especially in architectures having few registers. Maintaining separate condition or predicate registers requires additional hardware resources, such as rename logic for out of order execution, and register files. MIPS and Alpha architecture use general purpose registers (GPRs) to hold conditions, PowerPC and IA-64 use multiple condition/predicate registers.

In PowerPC ISA, for example, compare instructions can specify a 4 bit condition field a special purpose condition register containing 8 condition fields. For example, an X-form Compare instruction includes a BF field, an RA field and an RB field. Contents of registers specified by the RA field and RB field are compared and a resulting bit significant condition code is stored in the condition register (CR) at a location specified by the BF field. The bit significant condition code consists of 4 bits, bit 0 indicates a negative result, bit 1 indicates a positive result, bit 2 indicates a zero result and bit 3 indicates a summary overflow.

The PowerPC ISA includes logical instructions for performing logical operations on pairs of selected bits of the CR and storing a resulting bit in the CR. This organization requires a number of instructions specially adapted to operate on condition registers, to load condition registers, store condition registers, and so forth.

Limitations of prior art implementations are overcome by storing multiple conditions in a single general register file.

In this specification arithmetic instructions, may include, for example, well known logical operations such as AND, OR and EXCLUSIVE-OR (XOR) operations, COMPARE operations, SHIFT/ROTATE operations or algebraic operations such as ADD, SUBTRACT, MULTIPLY and DIVIDE operations.

In an embodiment, a hybrid of implicit condition codes and general purpose register instructions may be supported. Preferably condition evaluation information is stored in general purpose registers, such that the condition evaluation information can be further evaluated using standard register logical and comparison instructions. The standard instructions set condition codes that can be used by standard branch on condition instructions. Thus, a logical expression can be evaluated without the use of disruptive branch instructions to a point where the result is tested by a branch instruction.

In an embodiment, complex conditions are evaluated in general purpose registers. To provide this embodiment on a legacy ISA, new instructions are added to produce a condition indication in a general purpose register, however the legacy ISA logical instructions and branch on condition code instructions are used.

Based on the embodiment the /Test/ routine can be assembled into sequential instructions, reducing the amount of disruptive branching of the previous embodiments as exemplified using new compare instructions as follows;

```
/Test/ if (((r1 < r2) && ( r1 >= r3)) || ((r1 >= r2) && (r2 >= r4)))
/** foo **/
else
/ bar /
```

Is now implemented by:

```
.LCFI3:
    crLT3       r8, r1,r2 /** new compare LT, if r1 less than r2
    store 1 in r8, else store 0 in r8 **/
    crGE3       r9, r1,r3 /** new compare GT or EQ, if r1 GT
    or EQ r3 store 1 in r8, else store 0 in r8 **/
    N           r8, r9 /** legacy AND, r8 AND r9 -> r8 **/
    crGE3       r9, r1,r2 /** new compare GT or EQ, if r1 GT
    or EQ r2 store 1 in r9, else store 0 in r9 **/
    crGE3       r10, r2,r4 /** new compare GT or EQ, if r2 GT
```

```
or EQ r4 store 1 in r10, else store 0 in r10 **/
N          r9, r10 /** legacy AND, r9 AND r 10 -> r9 **/
O          r8, r9 /** legacy OR, r8 OR r9 -> r8, set cc =1
if result not 0 **/
    beq        .L9 /** legacy Branch on Condition, Branch to
L9 if cc =1, ELSE fall thru to L20 **/
.L10:
    /*** foo **/
.
.L9:
    /** bar **/
```

In another example, related to FIG. 10 use of a Rotate-and-Insert (RNSBG) instruction, as exemplified by IBM z/Architecture, that rotates an operand and ANDs a selected portion with another operand value, the value of the compare-and-insert (CRIR) instruction is shown as follows:

// if (((R1<R2)&&(R1>=R3))||((R1>=R2)&&(R2>=R4)))
CRIR R1,R2,LT,R0,0 // If R1 less than R2, place a 1 in bit 0 of R0.
CRIR R1,R3,GE,R0,1 // If R1 greater than or equal R3, place a 1 in bit 1 of R0.
CRIR R1,R2,GE,R0,2 // If R1 greater than or equal R2, place a 1 in bit 2 of R0.
CRIR R2,R4,GE,R0,3 // If R2 greater than or equal R4, place a 1 in bit 3 of R0.
RNSBG R0,R0,0,2,1 // Rotate 2nd op (R0) left 1 bit, & AND with original R0; // Bits 0 and 2 contain T/F results of 1st two comparisons // and last two comparisons.
ROSBG R0,R0,0,0,2 // Rotate 2nd op left 2 bits and OR with original R0, merging // the results. CC shows final answer.

The new compare instructions illustrated above include CrLT (compare less-than) and CrGE (compare greater-than or equal) which compare values of two registers and stores a condition according to the instruction in a target general register, preferably as a single least significant bit padded with high order 0s. The new compare instructions can designate the comparison to be made as part of the opcode, or preferably as a mask field. In an example, the mask field is bit significant and each bit position, when 1 provides a test. For example, bits 0-3 could be coded as follows:
  0=Result zero;
  1=Result less than zero;
  2=Result greater than zero;
  3=result all 1's
Or
  0=Operand 1 equals Operand 2;
  1=Operand 1 less than Operand 2;
  2=Operand 1 greater than Operand 2;
  3=Result all 1's
  or a coding for one or more of equal, zero, low, minus, mixed, high, plus, ones or overflow or any other appropriate indication.
;
Since the value of the target register is encoded to be a single bit, legacy logical operations can be performed on the register to perform the complex evaluation as shown above.

In another aspect of the invention, computational operations include an additional target register specification operand, or are provided with a prefix including an additional target register specification, whereby the additional target compares the computational result value against another value and indicates whether a condition applies, and a condition specification, preferably specified as a mask. The another value can be either implicit (such as an implicit constant of 0), a defined arithmetic condition (such as overflow, or an floating point not a number (NaN), floating point infinity, floating point underflow, in accordance with a specification such as the IEEE floating point standards, and so forth), or the comparison against an explicitly specified additional operand.

An example of such an embodiment performing a comparison against an implict value of 0 may be a "test" prefix, as follows:
  TST<EQ>rC SUB r1, r2
may be used to compute an arithmetic result in accordance with the definition of the subtract instruction, and further set the result whether it is equal to zero:
  R1=R1−R2
  if r1==0
    rC=1
  else
    rC=0

The preceding is only one example, in order to teach the embodiment. Other logical operations are possible, for example a legacy "or-not" (ON) or "and-not" (NN) could be employed in architectures that support "or-not" and "and not" instructions.

In an embodiment, such operations could employ portions of registers, for example, in an ISA having instructions for logical operations on different sized operands (64 bit, 32 bit and 16 bit for example), the embodiment would conserve registers by using 32 bit operands, or conserve even more register space by using 16 bit operands.

In the z/Architecture ISA, the high-word facility could be employed, which provides specific instructions for operating on low order 32 bit operands and other specific instructions for operating on high order 32 bit operands of a 64 bit register ISA.

In an embodiment, in addition to the arithmetic instruction performing the operation and producing a result, the arithmetic instruction specifies a location, within a general register of the instruction set architecture (ISA) for storing a condition indicative of the produced result. For example, in an embodiment, an AND operation may produce a zero result or a result having one or more 1's.

In another embodiment, a value of a first operand of an AND operation may be greater than the value of a second operand, the condition would indicate which of these were true.

In an embodiment, an AND operation may produce a zero result or a result having one or more 1's. the condition would indicate the result was zero or one or more 1's.

In an embodiment, a compare operation may determine, any one of one operand being greater than, equal to or less than another operand, the condition would indicate one or more of these being true or not true.

In an embodiment, an ADD operation may produce a positive result, an over-flow or a negative result, the condition would indicate which of these were true.

In an embodiment, the condition(s) being tested, are indicated in a mask field of the instruction. For example, in an algebraic operation or shift/rotate operations individual bits of the mask field could respectively specify one or more of:
  Result zero; Result less than zero; Result greater than zero;
  Other example mask field encodings could, for example specify one or more of:
  Result all 1's;
  Operand 1 equals Operand 2;
  Operand 1 less than Operand 2;
  Operand 1 greater than Operand 2;
  Result all 1's;

Or a coding for one or more of equal, zero, low, minus, mixed, high, plus, ones or overflow or any other appropriate indication.

Thus, an arithmetic Subtract instruction having a mask field of 0000'b would always set the condition to 0, independent of the result of the subtraction. An arithmetic Subtract instruction having a mask field of 0001'b would set the condition to 0 if the result was not zero, and 1 if the result was zero. An arithmetic Subtract instruction having a mask field of 0011'b would set the condition to 0 if the result were greater than zero, and 1 if the result were either zero or greater than zero, In an embodiment, the mask field is encoded in the opcode field of the instruction.
  0 Result zero; no overflow
  1 Result less than zero; no overflow
  2 Result greater than zero; no overflow
  3 Overflow In a Logical operation, individual bits of the mask field could respectively specify for example:
  0 Result zero
  1 Result not zero In a compare operation, individual bits of the mask field could respectively specify for example:
  0 Operands equal
  1 First operand low
  2 First operand high In an embodiment, the arithmetic instruction comprises a mask field, a register field for identifying which general register is to be used for setting conditions, and an index field for specifying which bit or bits of the general register are to be used for setting conditions.

In an embodiment, the general registers are any one of general purpose registers (GPRs) of an instruction set architecture (ISA), floating point registers of the ISA, vector registers of the ISA or any set of registers, addressable by instructions and usable by a program for performing arithmetic or logical operations. The general purpose registers for use by non floating point operations, the general purpose registers addressable by instructions for having operands to be used in accessing memory, operands to be used in non-floating point arithmetic operations and the like.

In an embodiment, the ISA includes condition code registers, separate and distinct from general registers. The condition code registers are saved and restored during context switches, in addition to general purpose registers, also saved and restored during context switches.

In an embodiment, the arithmetic instruction optionally stores condition codes in condition code registers as well as conditions in general registers, wherein the condition code registers are separate and dist from the general registers.

In an embodiment, arithmetic instructions are provided that designate a location in the target register for storing the condition. Thus, the target register can hold the results of a plurality of arithmetic operations. These arithmetic instructions, not only designate a target register, but also provide an index field. The index field of the arithmetic instruction indicates the location of the bit(s) of a general register, to which a condition indication will be stored.

In an embodiment, an index of, for example 0, could indicate that no condition indication is to be stored in a general register, but rather, a condition code is to be stored in a condition code register.

In an embodiment, bit mask (BM) instructions are provided for testing multiple conditions in a general register resulting from respective multiple arithmetic instructions. After several arithmetic instructions are executed causing respective bits in a general register to be set with condition indicators, a bit mask instruction may be executed, to determine if a predefined combination of bits are set in the general register. The bit mask instruction may, in an embodiment, set condition codes that can be used by a branch on condition instruction to take an action if the predefined combination is set. In another embodiment, the bit mask instruction may itself, set a condition in a designated location in the general register.

In an embodiment, bit mask instructions for testing conditions in a general register may test for 3 states, 1, 0 and don't care. This may be done, for example, by providing 2 bits in the bit mask for each bit to be tested.

In an embodiment an ISA having separate condition code registers includes a "Compare and Insert Result (CIR)". instruction which stores a single bit Boolean (1=True, 0=False) condition in an instruction specified location of a general purpose register, Advantageously, a program can use the CIR instruction to compute multiple conditions and store them into CIR identified locations of a single GPR. This enables a new form of code generation to compute complex Boolean conditions to be enabled that greatly reduces the disruptive performance impact of Branch instructions. In accordance with the code generation method for complex Boolean conditions, at least one condition is extracted from a GPR holding multiple conditions. A rotate and operate instruction is performed to compute a condition, and the result is inserted into a general purpose register. In another aspect, the complex condition is recorded in a condition code, and a conditional branch is executed based thereupon.

Advantages include the benefit of using pre-existing ISA instructions including the pre-existing Branch on condition code instructions rather than defining new Branch instructions. Furthermore, having the condition indicators in general registers, enables the use of the full set of pre-existing ISA instructions to determine complex conditions, reducing the branchyness of traditional condition determination.

Figure 10:
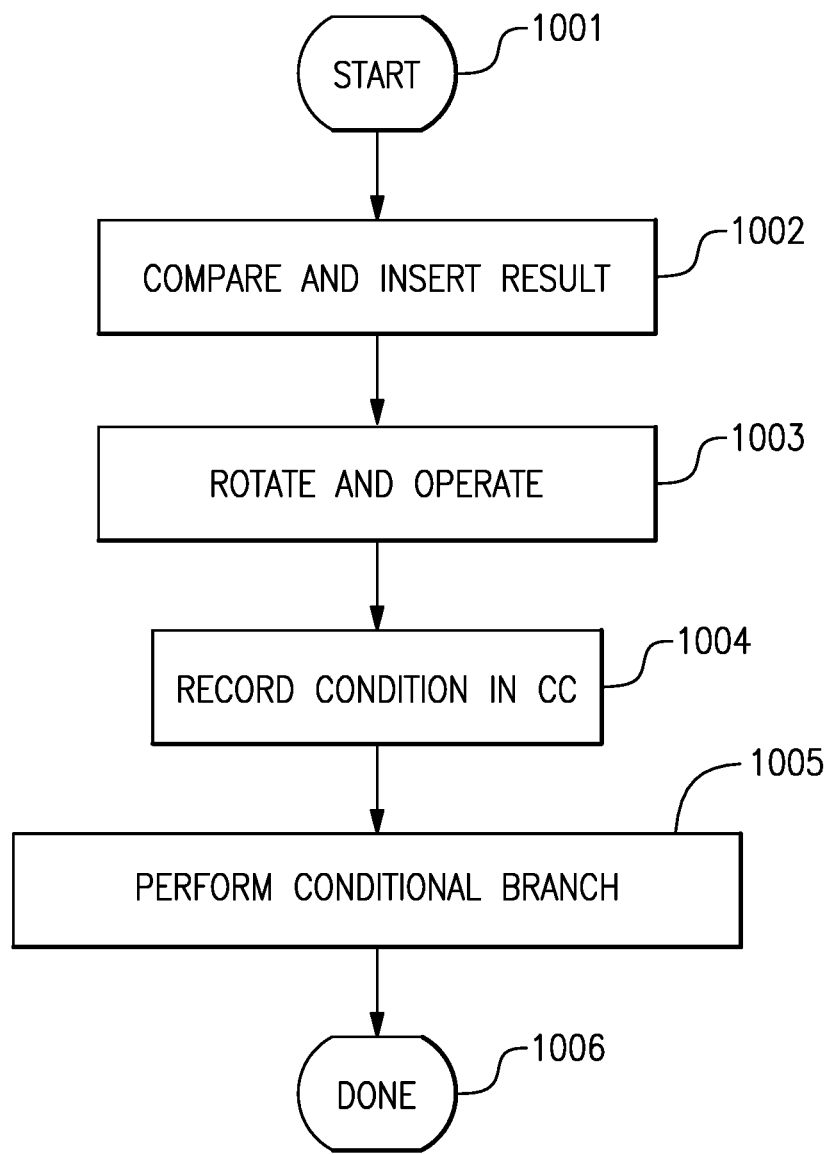
FIG. 10 illustrates an example flow of a compare and insert instruction.

Referring to FIG. 10, a flow chart depicts an example use of the Compare and Insert Result instruction. A program routine starts execution 1001 by executing one or more Compare and Insert Result instructions 1002 to set conditions in a target register. A Rotate and Operate instruction is executed 1003 to test for a complex condition existing in the target register. The Rotate and Operate (ROT) instruction, rotates the operand of the target register and performs an operation (such as AND, OR or XOR) on a ROT instruction specified range of bits of the target register and sets a condition code accordingly 1004. A Branch on Condition (BOC) instruction is executed 1005 to branch to a target routine if the complex condition is matched to complete 1006 the routine. In another embodiment, multiple ROC instructions may be used to facilitate testing for complex conditions in the target register. In another embodiment, other instructions employing masking operations for example could be used instead of, or in addition to, the ROT instruction to test the complex conditions.

Figure 11:
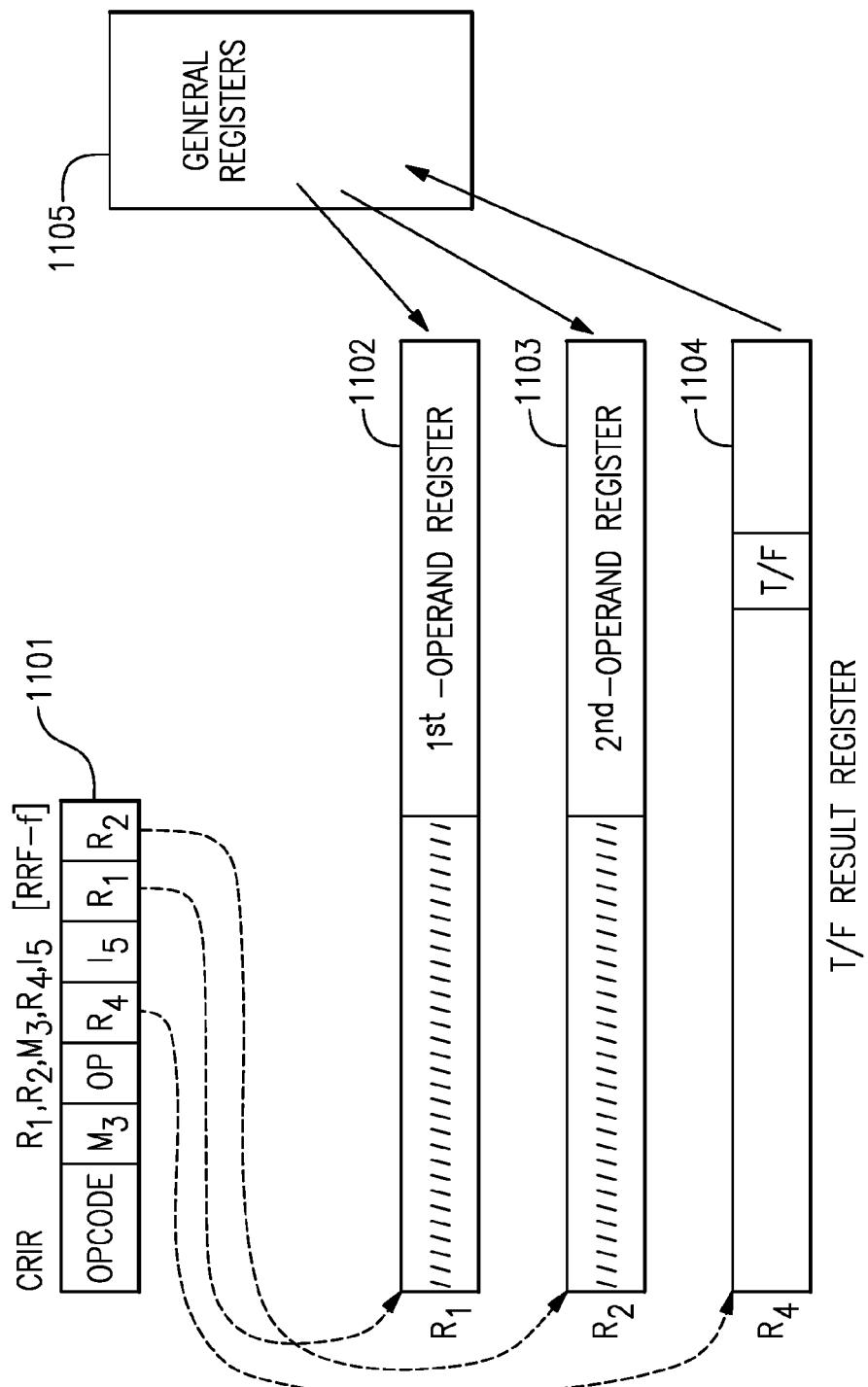
FIG. 11 depicts an example Register and Register form of the compare and insert instruction.

Referring to FIG. 11, an example RR (Register and Register) form of the Compare and Insert Result (CRIR) instruction is shown. The CRIR instruction includes an OpCode field, a mask field ($M_3$), Op field, first register field ($R_1$), second register field ($R_2$), fourth register field (R4) and an immediate field ($I_5$). The $R_1$ field specifies a general register having a first operand, the $R_2$ field specifies a register having a second operand to be compared with the first operand, and the $R_4$ field specifies the target register to hold the Boolean result of the comparison. In an embodiment, the $M_3$ field specifies a condition to be tested such as:

0—Operands equal
1—first Operand is less than the second operand
2.—first operand is greater than the second operand The comparison Boolean (True=1/False=0) result, based on the test presented by $M_3$ is loaded into an $R_4$ bit position determined by the $I_5$ field. In a 64 bit register, the bit set may be bit number $48+I_5$ for example.

Figure 12:
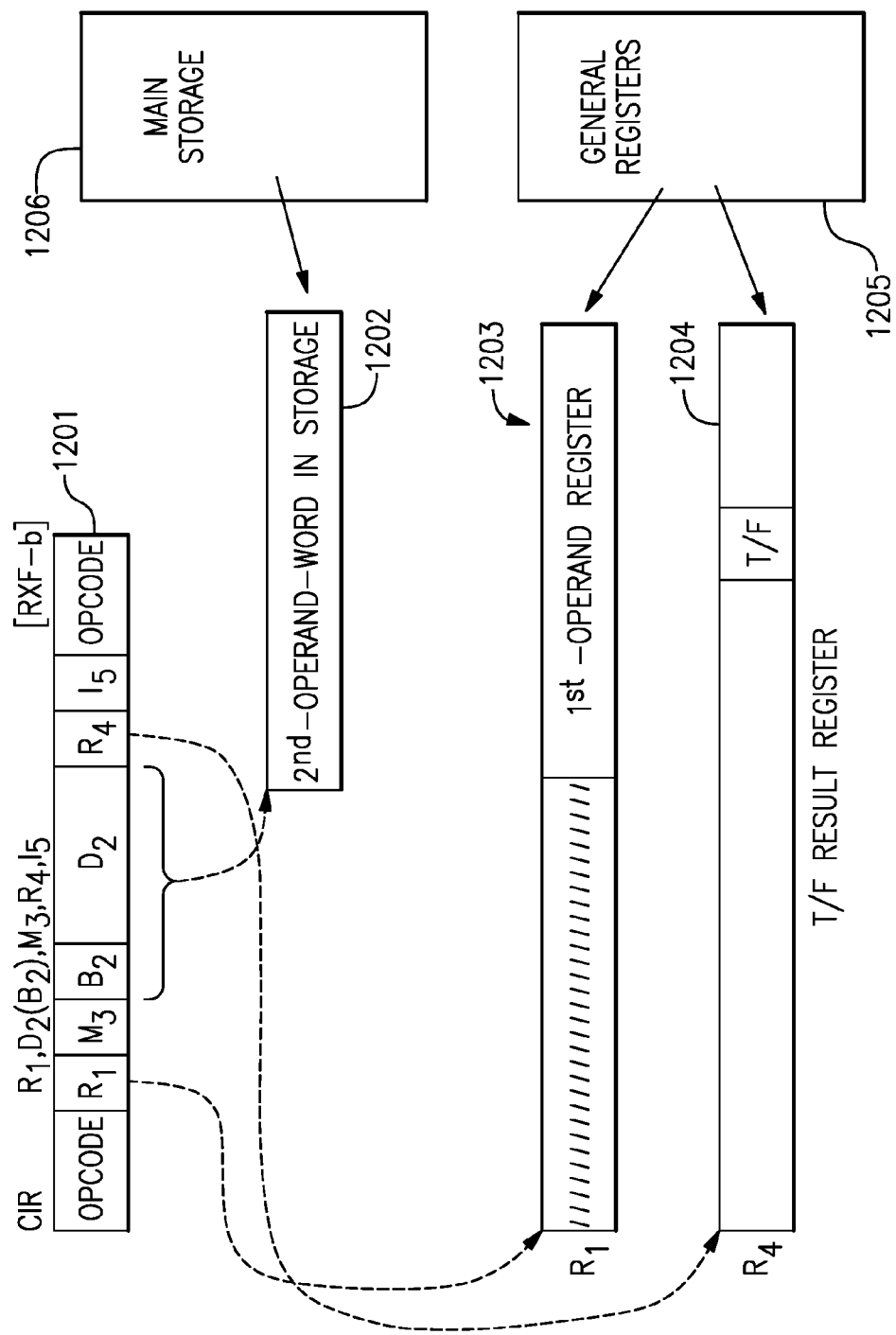
FIG. 12 depicts an example Register and Storage form of the compare and insert instruction.

Referring to FIG. 12, an example RS (Register and Storage) form of the Compare and Insert Result (CRIR) instruction is shown. The CRIR instruction includes an OpCode field, a mask field ($M_3$), OpCode extension field, a first register field ($R_1$), a Base register field ($B_2$), a Displacement field ($D_2$), a fourth register field ($R_4$) and an immediate field ($I_5$). The $R_1$ field specifies a general register having a first operand, the $B_2$ field specifies a register having a memory address. The memory address in $B_2$ is added to the Displacement field value of $D_2$ to form an address of a second operand in memory. The second operand is compared with the first operand, and the $R_4$ field specifies the target register to hold the Boolean result of the comparison. In an embodiment, the $M_3$ field specifies a condition to be tested such as:

0—Operands equal
1—first Operand is less than the second operand
2.—first operand is greater than the second operand Base on the teaching of the CRIR instructions, one skilled in the art can easily contemplate other Operate-and-insert Result (OIR) instructions that could perform operations of existing instructions, and set conditions in a target register in a similar fashion to the CRIR instructions shown above. In fact, the ROC instruction shown above could advantageously be modified to add the capability of setting a condition in a target register, to be tested by a later instruction.

Figure 13:
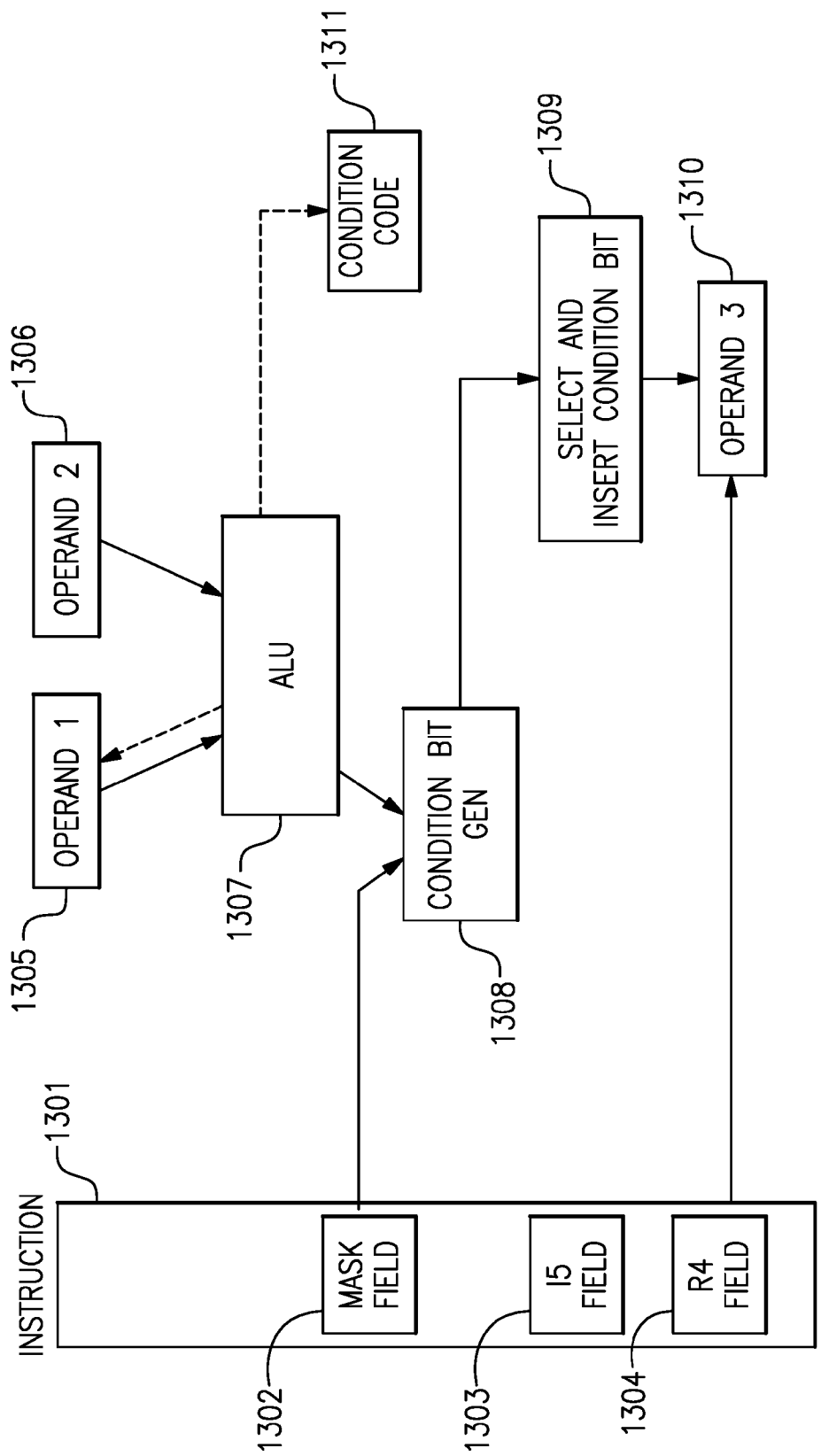
FIG. 13 depicts an example flow of an embodiment.

Referring to FIG. 13, in an embodiment, an instruction 1301 includes an Opcode field 1312, a mask field 1302, an I5 index field 1303, and an R4 register field 1304. When the instruction is executed, an operation, specified by the Opcode field 1301, is performed on at least one of two operands, operand 1 1305 and operand 2 1306. the operation is performed by an arithmetic logic unit (ALU) 1307, and a result may be written to operand 1 1305. The mask field 1302 specifies one of a plurality of possible conditions to be tested for. Based on the operation performed or the result of the operation, and the mask field 1302 specified condition, a Boolean condition bit is generated 1308, the bit having values, for example, of 1=True, or 0=False. The condition bit is written to a bit position of operand 3 1310 specified by the I5 field 1303 as determined by a select and insert condition bit operation 1309, wherein operand 3 is specified by the R4 field 1304. Operand 1 1305, operand 2 1306 and operand 3, may be located in general registers, floating point registers or memory, or a combination thereof. In an embodiment, execution of the instruction 1301 also sets a condition code 1311. In an embodiment, the condition bit generation is based on a machine state being tested, a next instruction operation or another operation rather than an arithmetic or logical operation performed on an instruction specified register or memory operand.

In an embodiment, the instruction 1301 is the Compare and Insert Result (CRI) instruction 1201, comprising a split opcode field, an R1 field specifying operand 1 1305, an R2 field specifying a register having operand 2 1306 (or optionally as in CRI instruction 1101, a B2 field and D2 field specifying a location in memory of operand 2 1306), the M3 mask field 1302, the R4 field and the I5 field.

In other embodiments of the instruction 1301, the instruction does not have an I5 field (or, in an embodiment, when the I5 field is 0's) the condition bit is stored in predetermined location, preferably the least significant bit position, of operand 3 1310 and 0's are inserted in the other bits of operand 3 1310.

Figure 14:
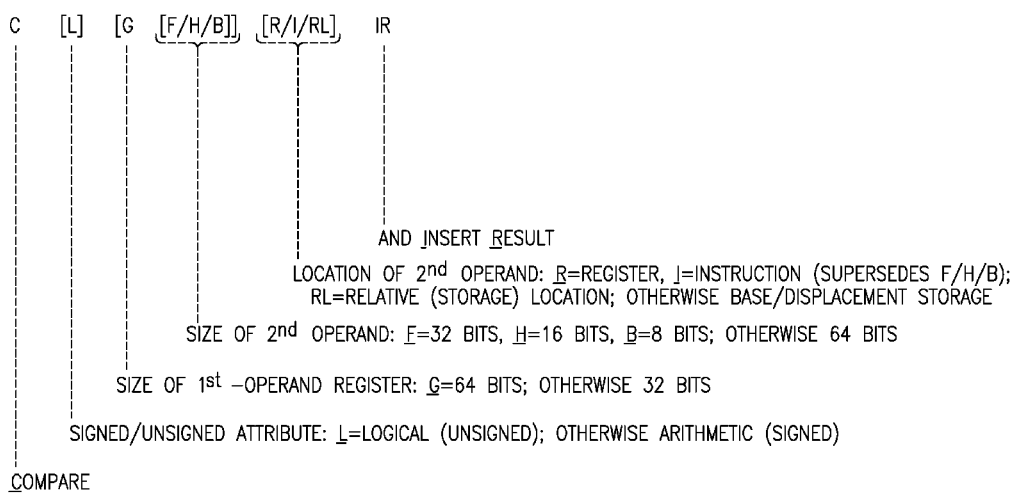
FIG. 14 depicts example mnemonics.

Referring to FIG. 14, example instruction mnemonics are explained for use by a programmer in describing the CIR instruction.

Figure 15:
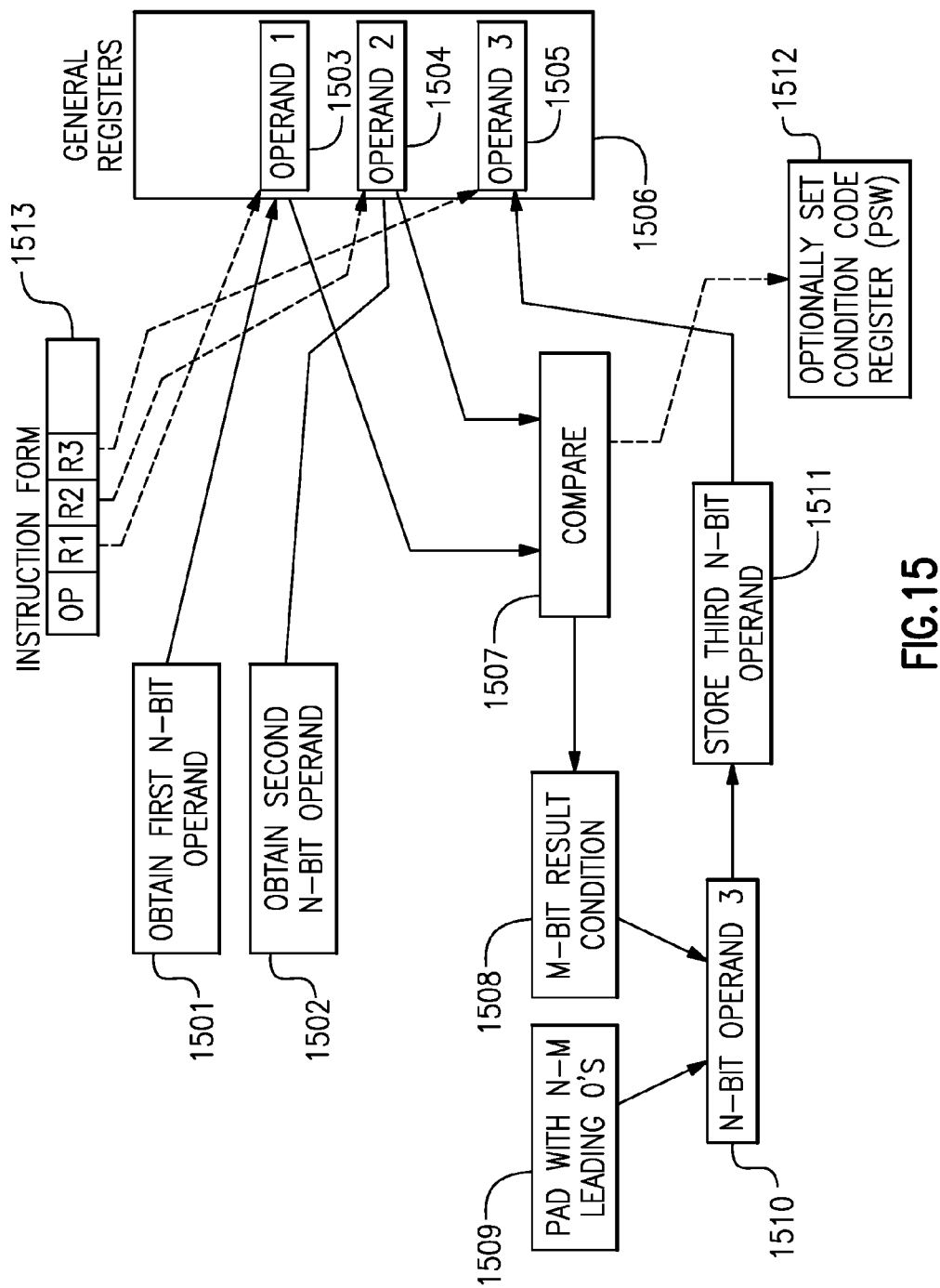
FIG. 15 depicts an example flow of an embodiment.

Referring to FIG. 15, an example instruction is formatted 1513 to include an opcode (OP) field, an R1 first register field for locating a first operand in a general register 1506, an R2 second register field for locating a second operand and an R3 third register field for locating a third operand. Other instruction formats could be used, including an instruction wherein one or more of the operand locations are implicit, that is, defined for the instruction by the ISA. In another format, a single field designates two operands, for example, R2 can designate a second operand and a third operand, wherein, when the instruction is executed, the second operand is destructively overwritten by the third operand. In another format, operands are located in adjacent pairs of registers, wherein a single field designates an even/odd pair of registers, and one operand is assigned to the even register, and another operand is assigned to the odd register. In yet another format, at least one of the operands is in main storage at a location identified by the instruction.

In an example embodiment, when the instruction 1503 is executed, a first n-bit operand 1503 (operand 1) is obtained 1501 from general registers 1506 and a second n-bit operand 1504 (operand 2) is obtained 1502 from general registers 1506. A compare 1507 is performed on the first operand 1503 and second operand 1504 to produce an m-bit result. The result indicates the result 1508 of the compare 1507. The result is padded 1509 with n–m leading 0's to form an n-bit third operand 1510 that is stored 1511 in general registers 1506 as a third operand 1505 (operand 1).

In an embodiment the first operand 1503 (operand 1) and second operand 1504 (operand 2) may be of different bit lengths but treated as n-bit values. In another embodiment, the third operand is padded 1509 with fewer than n–m 0's as the third operand (operand 3) to be stored is less than n-bits. Preferably the operands are integral number of bytes, and are larger than m-bits.

In an embodiment, a logical or arithmetic operation is performed rather than the compare 1507 to produce an m-bit result condition 1508.

In another embodiment, when a logical or arithmetic operation is performed, the result condition is encoded as a third instruction in conjunction with a fourth operand receiving the result of said logical or arithmetic operation.

In one embodiment, a legacy instruction is modified with one of an instruction prefix and a prefix instruction to encode an instruction updating a third operand with a result condition.

In an embodiment, executing the compare instruction 1513 further comprises setting a condition code 1512 (PSW) indicating condition. That can be used directly by a Branch-on-condition type of instruction for example.

In an embodiment, the compare instruction 1513 specifies a first register (specified by R1) and a second register (specified by R2), wherein the first operand 1503 is obtained from the first register and the second operand 1504 is obtained from the second register and the third operand 1505 is stored in the second register (specified by R2).

In an embodiment, the storing the m-bit result condition 1508 comprises storing an indicator field as a low order field of the third operand 1505 and storing 0s to all other bits of the third operand 1505.

In an embodiment, the indicator field is an indicator bit, wherein the indicator bit is 1 based on the compare being equal and the indicator bit is 0 based on the compare being not equal.

In an embodiment, the compare instruction specifies a first register (implied or specified by R1), a second register (implied or specified by R2) and a third register (implied or specified by R3), wherein the first operand is obtained 1501 from the first register and the second operand is obtained 1502 from the second register and the third operand is stored 1511 in the third register.

In an embodiment, the compare instruction is a compare instruction of a first instruction set architecture (ISA) and the method further comprises: selecting, by emulation software, an emulation routine for performing the executing on a processor of a second ISA, wherein the emulation routine comprises instructions of the second ISA; and performing the executing using the emulation routine.

In an embodiment, a manufacturer, builds systems using electronic circuits and/or firmware, microcode or millicode to perform embodiments. The building of the systems being performed using manufacturing techniques known in the art to configure the system with the embodiment The manufacturer may design ASICs or obtain programmable circuits for example, and may create firmware to configure the ASICs to perform embodiments. In an example, the manufacturer may implement the embodiments in a computer having components 150 shown in FIG. 1. In an other embodiment a manufacturer, builds tangible storage media having instructions thereon, that, when executed by a processor cause the processor to perform embodiments, Some Advantages:

Embodiments provide several advantages, some of which are discussed as follows

Advantageously, conditions (condition codes) are stored in a general purpose register (in one embodiment, the general purpose register is designated by the instruction) rather than in special purpose registers. Thus, in a superscalar out-of-order processor having instructions for manipulating the conditions to be tested, no special renaming logic for special purpose condition registers is required as the general registers are already renamed in the microarchitecture, to support out-of-order instruction execution.

Advantageously, the conditions are stored within an instruction specified field of a general purpose register, the field being any one of 1 bit indicating a condition tested for, a bit significant field (each bit specifying a condition tested for), or an encoded field (indicating a condition tested for).

Advantageously, an ISA uses both specialty locations (PSW condition codes) as well as general registers for storing condition codes indicating a result of an operand operation. Advantageously, conditions are stored in a specialty location (register or memory) by some instructions of the ISA wherein Branch on condition instructions are provided for testing the specialty location and conditions are stored in register locations by other instructions of the ISA, whereby complex condition testing can be done on the conditions stored in the register locations without the use of Branch instructions, and branch decisions only introduced as deemed necessary by a programmer, thus greatly reducing the branch penalties.

Advantageously, instructions that test operands can set a single bit condition in registers based on an instruction specified test condition, specified, by example, a bit significant mask field indicating which of a plurality of tests are to be performed.

Advantageously, an instruction can specify a single bit location of a general register to hold a condition indicating result of a test performed by the instruction. Thus, a 16 bit general register can hold the single bit results of up to 16 tests. In another ISA having 64 bit general registers, up to 64 tests can be stored.

Advantageously, bit testing instructions can be used to analyze a complex condition by accessing the multiple single bit condition settings in the general register without requiring performance impact of intervening branch on condition instructions.

Advantageously, special test under mask instructions can interrogate complex conditions in a general register, by for example, ANDing (or ORing) the mask bits against corresponding condition bits of the general register.

Advantageously, integer instructions can manipulate the conditions in general registers, rather than requiring a separate set of instructions for testing specialty registers.

Advantageously, superscalar microarchitecture supporting condition codes need not provide separate rename logic for condition codes, as conditions codes are stored in general registers that already have renaming capability needed for out-of-order execution. If the condition code fields were implemented fields in a special purpose register/memory, additional rename logic would be needed for each field.

Advantageously, condition codes are stored in a register designated by the instruction, therefore, operands are not affected by the storing of the condition codes in general registers, as the general register identified for storing the condition code is specified by the instruction separately from the register location(s) specified for operands. Furthermore, operands in registers need not provide separate portions for operand values and condition indicators.

The full set of ISA instructions for manipulating general purpose registers can be employed to test for complex condition combinations without encountering significant branch penalties, since the bulk of the testing can be done with logical operations rather than branch on condition instructions.

Embodiments can be seamlessly added to a legacy ISA having special purpose condition registers (PSWs) wherein legacy branch on condition instructions test special purpose condition registers, wherein complex testing is accomplished using the invention in order to set up a branch on condition test.

In a commercial implementation, the instructions are used by programmers, such as operating system programmers writing in assembler language. These instruction formats stored in a storage medium may be executed natively in a z/Architecture IBM Server, or alternatively, in machines executing other architectures. They can be emulated in the existing and in future IBM mainframe servers and on other machines of IBM (e.g., pSeries® Servers and xSeries® Servers). They can be executed in machines where generally execution is in an emulation mode.

In emulation mode, the specific instruction being emulated is decoded, and a subroutine is built to implement the individual instruction, as in a C subroutine or driver, or some other technique is used for providing a driver for the specific hardware, as is within the skill of those in the art after understanding the description of an embodiment of the invention.

Moreover, the various embodiments described above are just examples. There may be many variations to these embodiments without departing from the spirit of the present invention. For instance, although a logically partitioned environment is described herein, this is only one example. Aspects of the invention are beneficial to many types of environments, including other environments that have a plurality of zones, and non-partitioned environments. Further, there may be no central processor complexes, but yet, multiple processors coupled together. Yet further, one or more aspects of the invention are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible. For example, although the controller described herein serializes the instruction so that one IDTE instruction executes at one time, in another embodiment, multiple instructions may execute at one time. Further, the environment may include multiple controllers. Yet further, multiple quiesce requests (from one or more controllers) may be concurrently outstanding in the system. Additional variations are also possible.

As used herein, the term "processing unit" includes pageable entities, such as guests; processors; emulators; and/or other similar components. Moreover, the term "by a processing unit" includes on behalf of a processing unit. The term "buffer" includes an area of storage, as well as different types of data structures, including, but not limited to, arrays; and the term "table" can include other than table type data structures. Further, the instruction can include other than registers to designate information. Moreover, a page, a segment and/or a region can be of sizes different than those described herein.

One or more of the capabilities of the present invention can be implemented in software, firmware, hardware, or some combination thereof. Further, one or more of the capabilities can be emulated.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

In an embodiment, the computer system is an emulation computer system having emulation software. The emulation software, executing on a processor of a first instruction set architecture (ISA), enables application software, written for a second ISA to execute on the processor. The emulation software includes routines for executing instructions of the second ISA and for providing features and functions of the second ISA to the application software such that the computing environment of the processor and emulation routine, appears to the application as a computing environment of the second ISA.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method comprising:
    executing, by a processor, one or more instructions to set a condition code in a condition code register to be tested by a branch-on-condition instruction;
    executing, by the processor, a compare instruction specifying one or more general registers distinct from the condition code register, the executing comprising:
        obtaining a first operand consisting of a number of bits;
        obtaining a second operand consisting of said number of bits;
        comparing, by the processor, the first operand and the second operand to determine a condition, the condition indicating a result of the comparing; and
        storing, by the processor, the condition in one of said instruction specified general registers without overwriting the condition code register, said one of said instruction specified general registers storing said number of bits; and
    executing, by the processor, a branch-on-condition instruction that tests the condition code of the condition code register to determine whether a branch is taken or not-taken.

2. The method according to claim 1, wherein the compare instruction specifies a first register and a second register of a set of general registers, wherein the first operand is obtained from the first register and the second operand is obtained from the second register and the condition indicating the result of the comparing is stored in the second register.

3. The method according to claim 1, wherein the storing the condition comprises storing an indicator field as a low order field of said one of said instruction specified general registers and storing 0s to all other bits of said one of said instruction specified general registers.

4. The method according to claim 3, wherein the indicator field is an indicator bit, wherein the indicator bit is 1 based on the compare being equal and the indicator bit is 0 based on the compare being not equal.

5. The method according to claim 1, wherein the compare instruction specifies a first register, a second register and a third register of a set of general registers, wherein the first operand is obtained from the first register and the second operand is obtained from the second register and the condition indicating the result of the comparing is stored as a third operand in the third register.

6. The method according to claim 1, wherein the compare instruction is a compare instruction of a first instruction set architecture (ISA) further comprising:
    selecting, by emulation software, an emulation routine for performing the executing on a processor of a second ISA, wherein the emulation routine comprises instructions of the second ISA; and
    performing the executing using the emulation routine.

* * * * *